US010733573B2

United States Patent
Wang et al.

(10) Patent No.: US 10,733,573 B2
(45) Date of Patent: Aug. 4, 2020

(54) METHOD, APPARATUS, AND SYSTEM FOR PUSHING INFORMATION

(71) Applicants: Alibaba Group Holding Limited, Grand Cayman (KY); Yu Wang, Hangzhou (CN); Rui Wang, Hangzhou (CN); Jinming Wang, Hangzhou (CN); Jiqiu Xu, Hangzhou (CN); Weiwei Fu, Hangzhou (CN); Wanli Min, Hangzhou (CN)

(72) Inventors: Yu Wang, Hangzhou (CN); Rui Wang, Hangzhou (CN); Jinming Wang, Hangzhou (CN); Jiqiu Xu, Hangzhou (CN); Weiwei Fu, Hangzhou (CN); Wanli Min, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 252 days.

(21) Appl. No.: 15/551,187

(22) PCT Filed: Feb. 4, 2016

(86) PCT No.: PCT/CN2016/073443
§ 371 (c)(1),
(2) Date: Aug. 15, 2017

(87) PCT Pub. No.: WO2016/127906
PCT Pub. Date: Aug. 18, 2016

(65) Prior Publication Data
US 2018/0032962 A1 Feb. 1, 2018

(30) Foreign Application Priority Data

Feb. 15, 2015 (CN) .......................... 2015 1 0083233

(51) Int. Cl.
*G06Q 10/10* (2012.01)
*G06Q 40/00* (2012.01)
*G06Q 10/06* (2012.01)

(52) U.S. Cl.
CPC ....... *G06Q 10/1091* (2013.01); *G06Q 10/109* (2013.01); *G06Q 10/06* (2013.01); *G06Q 10/10* (2013.01); *G06Q 40/00* (2013.01)

(58) Field of Classification Search
CPC ...... G06Q 10/06; G06Q 10/109; G06Q 10/10; G06Q 40/00; G06Q 90/00; G06F 17/30; G06F 15/00; G06F 15/02
(Continued)

(56) References Cited

U.S. PATENT DOCUMENTS 6,088,303 A * 7/2000 Oishi ................. G07C 1/14
368/107
7,233,919 B1 * 6/2007 Braberg ................. G06Q 10/10
705/32

(Continued)

FOREIGN PATENT DOCUMENTS

| CN | 104008184 A | 8/2014 |
| CN | 104063383 A | 9/2014 |

(Continued)

OTHER PUBLICATIONS

International Search Report to corresponding International Application No. PCT/CN2016/073443 dated Apr. 27, 2016 (2 pages).

*Primary Examiner* — Olusegun Goyea
(74) *Attorney, Agent, or Firm* — James J. DeCarlo; Greenberg Traurig, LLP

(57) ABSTRACT

The disclosed embodiments describe a method, apparatus, and system for pushing information. In one embodiment, the method comprises: receiving dynamic spatio-temporal behavior data of a moving individual; conducting an analysis according to historical dynamic spatio-temporal behavior (Continued)

data of the moving individual to acquire spatio-temporal behavioral characteristics of the moving individual; determining appropriate information as matching information for the moving individual according to the spatio-temporal behavioral characteristics of the moving individual in combination with dynamic spatio-temporal behavior data of the moving individual at a current time; and sending the matching information to the moving individual. In the method of the disclosure, behavioral characteristics of a moving individual are analyzed to obtain habit and preference characteristics of the moving individual. Targeted push information is sent, thereby solving the problem of pushed information having less diversified, targeted, and not so accurate content.

24 Claims, 12 Drawing Sheets

(58) Field of Classification Search
USPC .......... 705/32, 322, 7.13, 7.42, 7.16, 7.21, 705/14.58; 709/227; 702/141; 235/492
See application file for complete search history.

(56) References Cited

U.S. PATENT DOCUMENTS

| | | | | |
|---|---|---|---|---|
| 7,318,040 B2 * | 1/2008 | Doss | ............. | G06Q 10/063116 705/7.16 |
| 7,343,316 B2 * | 3/2008 | Goto | ............. | G06Q 10/06 705/7.16 |
| 7,634,432 B2 * | 12/2009 | Dracup | ............. | G06Q 10/06 705/32 |
| 8,290,804 B2 * | 10/2012 | Gong | ............. | G06Q 10/06311 705/7.13 |
| 8,788,308 B1 * | 7/2014 | Cox | ............. | G06Q 10/063116 705/7.16 |
| 9,070,162 B2 * | 6/2015 | Cherry | ............. | G06Q 40/00 |
| 9,111,402 B1 * | 8/2015 | Krishnan | ............. | G07C 1/10 |
| 2002/0083179 A1 * | 6/2002 | Shaw | ............. | G06F 16/9574 709/227 |
| 2002/0175211 A1 * | 11/2002 | Dominquez | ............. | G06K 17/0022 235/492 |
| 2005/0033670 A1 * | 2/2005 | Cheng | ............. | G06Q 10/06 705/32 |
| 2010/0324964 A1 * | 12/2010 | Callanan | ............. | G06Q 10/06 705/322 |
| 2011/0224893 A1 * | 9/2011 | Scofield | ............. | G01C 21/3492 701/119 |
| 2011/0307303 A1 * | 12/2011 | Dutta | ............. | G06Q 10/00 705/7.42 |
| 2012/0123733 A1 * | 5/2012 | Lo | ............. | A61B 5/11 702/141 |
| 2014/0278629 A1 * | 9/2014 | Stephenson | ............. | G06Q 10/1091 705/7.13 |
| 2015/0081487 A1 * | 3/2015 | Porter | ............. | G06Q 50/22 705/32 |
| 2015/0348214 A1 * | 12/2015 | Jain | ............. | G06Q 40/125 705/14.58 |
| 2015/0363745 A1 * | 12/2015 | Hatch | ............. | G06Q 10/1091 705/32 |
| 2017/0109682 A1 * | 4/2017 | Chetlur | ............. | G06Q 10/06398 |

FOREIGN PATENT DOCUMENTS

| | | |
|---|---|---|
| CN | 104090980 A | 10/2014 |
| CN | 104239466 A | 12/2014 |
| CN | 104252541 A | 12/2014 |

* cited by examiner

METHOD, APPARATUS, AND SYSTEM FOR PUSHING INFORMATION

CROSS-REFERENCE TO RELATED APPLICATIONS

This application claims the benefit of priority of Chinese Application No. CN201510083233.7, titled "Method, Apparatus and System for Information Push," filed on Feb. 15, 2015, and PCT Application No. PCT/CN2016/073443, titled "Method, Apparatus and System for Information Push" filed on Feb. 4, 2016, the disclosure of each hereby incorporated by reference in their entirety.

BACKGROUND

Technical Field

The disclosure relates to the field of computer communications technologies and, in particular, to a method, apparatus, and system for pushing information. The disclosure further relates to a method and apparatus for collecting behavioral information of moving individuals. The disclosure also relates to an electronic device for pushing information.

Description of the Related Art

At present, mobile applications having a push function built therein have become the mainstream for advertising. However, existing methods of sending push information in mobile applications lag behind the development of the applications, restricting the development of advertising technology. In current systems, methods of sending push information based in mobile applications mainly include (1) acquiring and recording historical information generated based on a user's browsing behavior; predicting the user's interests according to the historical information, and sending push information that might interest the user to the user; (2) summarizing registration information of a user and using that information as the characteristic information of the user; and sending push information having high similarity to the characteristic information to the user; and (3) sending push information having the highest search popularity to a user by analyzing user groups on the Internet.

Current systems for sending push information discussed above have the following defects.

First, historical information generated by a user's browsing behavior includes a large amount of data and is wide-ranging. As a result, prediction of the user's interests according to historical information usually includes many errors and is not precise, leading to less targeted push information.

Second, because user information supplied during registration is usually not complete and detailed enough, the push information generated from summarizing according to registration information of a user is not evenly balanced between accurate information and diversified content, leading to accurate push information but less diversified content.

Third, push information according to search popularity has low relevance. For example, the content of the push information might not interest the user.

In view of the above, because current systems do not deeply mine original data of a user, complete and precise behavioral characteristic information of the user cannot be obtained which, in turn, leads to difficulty in sending the needed push information to the user in time. This less targeted information, therefore, cannot meet each user's personalized needs.

BRIEF SUMMARY

To solve the problems in current systems where pushed information is less targeted, diversified, and accurate, the disclosed embodiments provide a method for pushing information, an apparatus for pushing information, and a system for pushing information. The disclosure further describes methods and apparatuses for collecting behavioral information of a moving individual. The disclosure also relates to an electronic device for pushing information.

One embodiment of the disclosure provides a method for pushing information, comprising: receiving dynamic spatio-temporal behavior data of a moving individual at a current time; conducting an analysis according to historical dynamic spatio-temporal behavior data of the moving individual to acquire spatio-temporal behavioral characteristics of the moving individual; determining appropriate information as matching information for the moving individual according to the spatio-temporal behavioral characteristics of the moving individual in combination with dynamic spatio-temporal behavior data of the moving individual at a current time; and sending the matching information to the moving individual.

Optionally, prior to the step of receiving dynamic spatio-temporal behavior data of a moving individual at a current time, the method further comprises: receiving static information of the moving individual, wherein the static information at least comprises profile information of the moving individual; and when the moving individual has a transportation vehicle, the static information may further comprise vehicular information of the transportation vehicle owned by the moving individual.

Optionally, the dynamic spatio-temporal behavior data of a moving individual comprises region positioning information reflecting a location of the moving individual and time information reflecting an information generation time.

Optionally, the dynamic spatio-temporal behavior data of a moving individual further comprises a moving distance between sampling points.

Optionally, the behavioral characteristics comprise at least one of the following behavioral characteristics: clock-in and clock-out time of the moving individual, clock-in and clock-out locations of the moving individual, a short break time of the moving individual, and a short break location of the moving individual.

Optionally, a method for calculating the clock-in and clock-out time of the moving individual comprises: acquiring appearance times and disappearance times of the moving individual from the dynamic spatio-temporal behavior data; calculating a break time according to an appearance time of the moving individual and a disappearance time of the moving individual that appear in groups, and determining whether the break time is within a break condition, and if yes, recording the break time; determining whether a frequency of the recorded break time of the moving individual exceeds a predetermined threshold; if exceeded, calculating an appearing frequency of the appearance time of the moving individual in each hour period and calculating an appearing frequency of the disappearance time of the moving individual in each hour period; acquiring an hour period having the highest appearing frequency of the appearance time of the moving individual; calculating an average of the appearance times of the moving individual within the hour period, and using the average of the appearance time of the moving individual as the clock-in time of the moving individual; and acquiring an hour period having the highest appearing frequency of the disappearance time of the moving individual; calculating an average of the disappearance times of the moving individual within the hour period, and using the average of the disappearance time of the moving individual as the clock-out time of the moving individual.

Optionally, in the step of determining whether a frequency of the recorded break time of the moving individual exceeds a predetermined threshold, if a determination result is not exceeded, an average of the appearance times of the moving individual is calculated and the average of the appearance times of the moving individual is used as the clock-in time of the moving individual. An average of the disappearance times of the moving individual is calculated and the average of the disappearance times of the moving individual is used as the clock-out time of the moving individual.

Optionally, determining whether the break time is within a break condition comprises comparing a length of the break time with a time length specified by the break condition and, if the length of the break time is within the time length specified by the break condition, determining that the break time is within the break condition.

Optionally, the time length specified by the break condition is 12 to 16 hours.

Optionally, after the step of calculating the clock-in and clock-out time of the moving individual, the clock-in and clock-out locations of the moving individual further need to be calculated, and a method for calculating the clock-in and clock-out locations of the moving individual comprises: acquiring, according to the recorded break time, region positioning information of appearance times and disappearance times of the moving individual corresponding to the break time.

According to the aforementioned information, the clock-in location of the moving individual is obtained through the following steps: calculating an average of the region positioning information of the appearance times of the moving individual; comparing region positioning information of each appearance time of the moving individual with the average of the region positioning information; obtaining region positioning information of an appearance time of the moving individual closest to the average of the region positioning information; and using the region positioning information as a median point of the clock-in location; filtering out region positioning information corresponding to an appearance time of the moving individual at a location with a distance to the median point of the clock-in location greater than a predetermined distance; and calculating an average of remaining region positioning information corresponding to appearance times of the moving individual; and using the average of the remaining region positioning information of the appearance times of the moving individual as the clock-in location of the moving individual.

According to the aforementioned information, the clock-out location of the moving individual is obtained though the following steps: calculating an average of the region positioning information of the disappearance times of the moving individual; comparing region positioning information of each disappearance time of the moving individual with the average of the region positioning information; obtaining region positioning information of a disappearance time of the moving individual closest to the average of the region positioning information; and using the region positioning information as a median point of the clock-out location; filtering out region positioning information corresponding to a disappearance time of the moving individual at a location with a distance to the median point of the clock-out location greater than a predetermined distance; and calculating an average of remaining region positioning information corresponding to disappearance times of the moving individual; and using the average of the remaining region positioning information of the disappearance times of the moving individual as the clock-out location of the moving individual.

Optionally, a distance specified by the predetermined distance is 1000 meters.

Optionally, after the step of calculating the clock-in and clock-out time of the moving individual, the clock-in and clock-out locations of the moving individual further need to be calculated, and a method for calculating the clock-in and clock-out locations of the moving individual comprises: acquiring, according to the recorded break time, region positioning information of appearance times and disappearance times of the moving individual corresponding to the break time.

According to the aforementioned information, the clock-in location of the moving individual is obtained through the following steps: calculating an average of the region positioning information of the appearance times of the moving individual; and using the average of the region positioning information as a median point of the clock-in location; and comparing region positioning information of each appearance time of the moving individual with the median point of the clock-in location; obtaining region positioning information of an appearance time of the moving individual closest to the median point of the clock-in location; and using the region positioning information as the clock-in location of the moving individual.

According to the aforementioned information, the clock-out location of the moving individual is obtained through the following steps: calculating an average of the region positioning information of the disappearance times of the moving individual; and using the average of the region positioning information as a median point of the clock-out location; and calculating region positioning information of each disappearance time of the moving individual with the median point of the clock-out location; obtaining region positioning information of a disappearance time of the moving individual closest to the median point of the clock-out location; and using the region positioning information as the clock-out location of the moving individual.

Optionally, a method for calculating the short break location of the moving individual comprises: acquiring appearance times and disappearance times of the moving individual from the dynamic spatio-temporal behavior data; calculating a break time according to an appearance time of the moving individual and a disappearance time of the moving individual that appear in groups, and determining whether the break time is within a break condition, and if yes, recording the break time; acquiring, according to the recorded break time, region positioning information of appearance times and disappearance times of the moving individual corresponding to the break time; determining whether a frequency of the recorded break time of the moving individual exceeds a predetermined threshold; if exceeded, dividing a city where the moving individual is located into a plurality of regions according to latitude and longitude data of the city; and obtaining a region containing the greatest number of pieces of region positioning information of the moving individual; and using the region as the short break location of the moving individual.

Optionally, determining whether the break time is within a short break condition is to compare a length of the break time with a time length specified by the short break condition; and if the length of the break time is within the time length specified by the short break condition, determining that the break time is within the short break condition.

Optionally, the time length specified by the short break condition is between 15 minutes to 1 hour.

Optionally, the method for dividing a city where the moving individual is located into a plurality of regions according to latitude and longitude data of the city comprises converting the latitude and longitude data of the city where the moving individual is located into Geohash strings.

Optionally, after the step of calculating the short break location of the moving individual, the short break time of the moving individual further needs to be calculated; and a method for calculating the short break time of the moving individual comprises acquiring appearance times and disappearance times of the moving individual at the short break location.

According to the aforementioned information, a short break start time of the moving individual is obtained through the following steps: calculating one by one each time interval between appearance times of the moving individual, and acquiring the number of time intervals between appearance times of the moving individual having a time length shorter than a predetermined time; acquiring an appearance time of the moving individual having the greatest number of time intervals shorter than the predetermined time; and using the appearance time of the moving individual as an appearance base point; calculating a time interval between each appearance time of the moving individual at the short break location and the appearance base point, and obtaining appearance times of the moving individual having time intervals shorter than the predetermined time; and calculating an average of the appearance times of the moving individual having the time intervals shorter than the predetermined time; and using the average of the appearance times of the moving individual having the time intervals shorter than the predetermined time as the short break start time of the moving individual.

According to the aforementioned information, a short break end time of the moving individual is obtained through the following steps: calculating one by one each time interval between disappearance times of the moving individual, and acquiring the number of time intervals between disappearance times of the moving individual having a time length shorter than a predetermined time; acquiring a disappearance time of the moving individual having the greatest number of time intervals shorter than the predetermined time; and using the disappearance time of the moving individual as a disappearance base point; calculating a time interval between each disappearance time of the moving individual at the short break location and the disappearance base point, and obtaining disappearance times of the moving individual having time intervals shorter than the predetermined time; and calculating an average of the disappearance times of the moving individual having the time shorter than the predetermined time; and using the average of the disappearance times of the moving individual having the time intervals shorter than the predetermined time as the short break end time of the moving individual.

Optionally, the time length specified by the predetermined time is 2 hours.

Optionally, the predetermined threshold is 4.

Optionally, the method for determining appropriate information as matching information for the moving individual according to the spatio-temporal behavioral characteristics of the moving individual in combination with dynamic spatio-temporal behavior data of the moving individual at a current time comprises: acquiring clock-in and clock-out locations and a short break location of the moving individual; querying for shop information and restaurant information in regions where the clock-in and clock-out locations and the short break location are located; and using the shop information and the restaurant information as the matching information of the moving individual.

Optionally, after the step of sending the matching information to the moving individual, the method further comprises: receiving matching information on which an operation has been performed by the moving individual. In one embodiment, the method includes acquiring keywords according to the matching information, wherein the keywords comprises: a commodity type or a restaurant type; querying for matching information matching the keywords; and sending the matching information matching the keywords to the moving individual.

Correspondingly, an embodiment of the present application further provides an apparatus for pushing information, comprising: a behavioral information receiving unit, a behavioral characteristic calculation unit, a matching information unit, and a matching information sending unit, wherein the behavioral information receiving unit is configured to receive dynamic spatio-temporal behavior data of a moving individual at a current time; the behavioral characteristic calculation unit is configured to analyze historical data of the dynamic spatio-temporal behavior data of the moving individual to acquire spatio-temporal behavioral characteristics of the moving individual; the matching information unit is configured to determine appropriate information as matching information for the moving individual according to the spatio-temporal behavioral characteristics of the moving individual in combination with dynamic spatio-temporal behavior data of the moving individual at a current time; and the matching information sending unit is configured to send the matching information to the moving individual.

Optionally, the behavioral information receiving unit further comprises: a static information receiving unit, wherein the static information receiving unit is configured to receive static information of the moving individual, wherein the static information at least comprises profile information of the moving individual; and when the moving individual has a transportation vehicle, the static information may further comprise vehicular information of the transportation vehicle owned by the moving individual.

Optionally, the behavioral information receiving unit is specifically configured to receive region positioning information reflecting a location of the moving individual and time information reflecting an information generation time; and at least one of the following behavioral information reflecting a behavioral state of the moving individual: physiological characteristic data of the moving individual, and movement characteristic data of the moving individual.

Optionally, the behavioral information receiving unit is further configured to receive a moving distance between sampling points.

Optionally, the behavioral characteristic calculation unit is specifically configured to calculate clock-in and clock-out time of the moving individual; clock-in and clock-out locations of the moving individual; a short break time of the moving individual; and a short break location of the moving individual.

Optionally, the behavioral characteristic calculation unit comprises: a time acquisition unit, a break time calculation unit, a recording times judgment unit, an hour period calculation unit, and an hour period average calculation unit, wherein the time acquisition unit is configured to acquire appearance times and disappearance times of the moving individual from the dynamic spatio-temporal behavior data; the break time calculation unit is configured to calculate a break time according to an appearance time of the moving individual and a disappearance time of the moving individual that appear in groups, and determine whether the break time is within a break condition, and if yes, record the break time; the recording times judgment unit is configured to determine whether the frequency of recorded break time of the moving individual exceeds a predetermined threshold; the hour period calculation unit is configured to receive a result of the recording times judgment unit; and if a frequency of the recorded break time of the moving individual exceeds a predetermined threshold, calculate an appearing frequency of the appearance time of the moving individual in each hour period and calculate an appearing frequency of the disappearance time of the moving individual in each hour period; and the hour period average calculation unit is configured to acquire an hour period having the highest appearing frequency of the appearance time of the moving individual and an hour period having the highest appearing frequency of the disappearance time of the moving individual; calculate an average of the appearance times of the moving individual within the hour period and an average of the disappearance times of the moving individual within the hour period; use the average of the appearance times of the moving individual as the clock-in time of the moving individual; and use the average of the disappearance times of the moving individual as the clock-out time of the moving individual.

Optionally, the behavioral characteristic calculation unit further comprises: a time average calculation unit, wherein the time average calculation unit is configured to receive a result of the recording times judgment unit; and if the frequency of recorded break time of the moving individual does not exceed a predetermined threshold, calculate an average of the appearance time of the moving individual and an average of the disappearance time of the moving individual; use the average of the appearance time of the moving individual as the clock-in time of the moving individual, and use the average of the disappearance time of the moving individual as the clock-out time of the moving individual.

Optionally, the break time calculation unit is specifically configured to compare a length of the break time with a time length specified by the break condition; and if the length of the break time is within the time length specified by the break condition, determine that the break time is within the break condition.

Optionally, the behavioral characteristic calculation unit further comprises: a region positioning information acquisition unit, a location calculation unit, a median location calculation unit, an abnormal point filtering unit, and a location average calculation unit, wherein the region positioning information acquisition unit is configured to acquire, according to the recorded break time, region positioning information of appearance times and disappearance times of the moving individual that corresponds to the break time; the location calculation unit is configured to calculate an average of the region positioning information of the appearance times of the moving individual; and calculate an average of the region positioning information of the disappearance times of the moving individual; the median location calculation unit is configured to compare region positioning information of each appearance time of the moving individual with the average of the region positioning information; obtain region positioning information of an appearance time of the moving individual closest to the average of the region positioning information; and use the region positioning information as a median point of the clock-in location; and compare region positioning information of each disappearance time of the moving individual with the average of the region positioning information; obtain region positioning information of a disappearance time of the moving individual closest to the average of the region positioning information; and use the region positioning information as a median point of the clock-out location; the abnormal point filtering unit is configured to filter out region positioning information corresponding to an appearance time of the moving individual whose distance to the median point of the clock-in location is greater than a predetermined distance; and configured to filter out region positioning information corresponding to a disappearance time of the moving individual whose distance to the median point of the clock-out location is greater than a predetermined distance; and the location average calculation unit is configured to calculate an average of remaining region positioning information corresponding to appearance times of the moving individual and an average of remaining region positioning information of locations of disappearance times of the moving individual; use the average of the remaining region positioning information of the appearance times of the moving individual as the clock-in location of the moving individual; and use the location of the average of the remaining region positioning information of the disappearance times of the moving individual as the clock-out location of the moving individual.

Optionally, the behavioral characteristic calculation unit further comprises: a median calculation unit and an average calculation unit, wherein the median calculation unit is configured to calculate an average of the region positioning information of appearance times of the moving individual and an average of the region positioning information of disappearance times of the moving individual; use the average of the region positioning information as a median point of the clock-in location, and use the average of the region positioning information as a median point of the clock-out location; and the average calculation unit is configured to calculate region positioning information of each appearance time of the moving individual with the median point of the clock-in location; obtain region positioning information of an appearance time of the moving individual closest to the median point of the clock-in location, and use the region positioning information as the clock-in location of the moving individual; and to calculate region positioning information of each disappearance time of the moving individual with the median point of the clock-out location; obtain region positioning information of a disappearance time of the moving individual closest to the median point of the clock-out location, and use the region positioning information as the clock-out location of the moving individual.

Optionally, the behavioral characteristic calculation unit further comprises: a short break judgment unit, a region division unit, and a short break location acquisition unit, wherein the short break judgment unit is configured to calculate a break time according to an appearance time of the moving individual and a disappearance time of the moving individual that appear in groups, and determine whether the break time is within a short break condition; and if yes, record the break time; the region division unit is configured to receive a result of the recording times judgment unit; and if the frequency of recorded break time of the moving individual exceeds a predetermined threshold, divide a city where the moving individual is located into a plurality of regions according to the latitude and longitude coordinates data of the city; and the short break location acquisition unit is configured to obtain a region containing the greatest number of pieces of region positioning information of the moving individual; and using the region as the location where the moving individual takes a short break.

Optionally, the short break judgment unit is specifically configured to compare a length of the break time with a time length specified by the short break condition; and if the length of the break time is within the time length specified by the short break condition, determine that the break time is within the short break condition.

Optionally, the region division unit is specifically configured to convert the latitude and longitude coordinates data of the city that the moving individual is located in into Geohash coded strings.

Optionally, the behavioral characteristic calculation unit further comprises: a short break time acquisition unit, a time interval number calculation unit, a base point acquisition unit, a time interval calculation unit, and a short break time calculation unit, wherein the short break time acquisition unit is configured to acquire appearance times and disappearance times of the moving individual at the location for short breaks; the time interval number calculation unit is configured to calculate one by one each time interval between appearance times of the moving individual; acquire the number of time intervals between appearance times of the moving individual having a time length shorter than a predetermined time; and to calculate one by one each time interval between disappearance times of the moving individual; and acquire the number of time intervals between disappearance times of the moving individual having a time length shorter than a predetermined time; the base point acquisition unit is configured to acquire an appearance time of the moving individual having the greatest number of time intervals shorter than the predetermined time; and use the appearance time of the moving individual as an appearance base point; and to acquire a disappearance time of the moving individual having the greatest number of time intervals shorter than the predetermined time; and use the disappearance time of the moving individual as a disappearance base point; the time interval calculation unit is configured to calculate a time interval between each appearance time of the moving individual at the short break location and the appearance base point; obtain appearance times of the moving individual having time intervals shorter than the predetermined time; and to calculate a time interval between each disappearance time of the moving individual at the short break location and the disappearance base point, and obtain disappearance times of the moving individual having time intervals shorter than the predetermined time; and the short break time calculation unit is configured to calculate an average of the appearance times of the moving individual having the time intervals shorter than the predetermined time; and use the average of the appearance times of the moving individual having the time intervals shorter than the predetermined time as a short break start time of the moving individual; and to calculate an average of the disappearance times of the moving individual having the time intervals shorter than the predetermined time; and use the average of the disappearance times of the moving individual having the time intervals shorter than the predetermined time as a short break end time of the moving individual.

Optionally, the matching information unit further comprises: a location query unit and an information query unit, wherein the location query unit is configured to acquire clock-in and clock-out locations and a short break location of the moving individual; and the information query unit is configured to query for shop information and restaurant information in regions where the clock-in and clock-out locations and the short break location are located; and use the shop information and the restaurant information as the matching information of the moving individual.

Optionally, the apparatus for pushing information further comprises: an information recycling unit, a keyword acquisition unit, a keyword query unit, and a keyword information sending unit, wherein the information recycling unit is configured to receive matching information on which an operation has been performed by the moving individual; the keyword acquisition unit is configured to acquire keywords according to the matching information, wherein the keywords comprise:

the keyword query unit is configured to query for matching information matching the keywords; and the keyword information sending unit is configured to send the matching information matching the keywords to the moving individual.

In addition, an embodiment of the present application further provides a method for collecting behavioral information of a moving individual, comprising: acquiring dynamic spatio-temporal behavior data of a moving individual; sending the dynamic spatio-temporal behavior data of a moving individual to a server; and receiving matching information sent by the server.

Optionally, prior to the step of acquiring dynamic spatio-temporal behavior data of a moving individual, the method further comprises: acquiring static information of the moving individual, wherein the static information at least comprises profile information of the moving individual; and when the moving individual has a transportation vehicle, the static information may further comprise vehicular information of the transportation vehicle owned by the moving individual; and sending the static information of the moving individual to the server.

Acquiring static information of the moving individual is implemented through at least one of the following manners: profile information of the moving individual previously provided by the moving individual; and when the moving individual has a transportation vehicle, the static information may further comprise vehicular information of the transportation vehicle owned by the moving individual; and profile information of the moving individual and vehicular information of the transportation vehicle owned by the moving individual that is obtained from a third-party data source.

Optionally, the manner of acquiring dynamic spatio-temporal behavior data of a moving individual specifically comprises one of the following manners: acquiring time information through a startup time of the transportation vehicle owned by the moving individual; acquiring time information through a time of connection from a Bluetooth device in the transportation vehicle owned by the moving individual to a mobile terminal carried by the moving individual, and acquiring region positioning information of a region where the moving individual is located by the mobile terminal; acquiring time information through on and off time of a positioning device in the transportation vehicle owned by the moving individual, and acquiring region positioning information of a region where the moving individual is located by the positioning device; acquiring the dynamic spatio-temporal behavior data by an apparatus installed in a mobile terminal carried by the moving individual; and acquiring the dynamic spatio-temporal behavior data by a dedicated device in the transportation vehicle owned by the moving individual.

Optionally, the dynamic spatio-temporal behavior data of the moving individual specifically comprises: region positioning information reflecting a location of the moving individual and time information reflecting an information generation time; and at least one of the following behavioral information reflecting a behavioral state of the moving individual: physiological characteristic data of the moving individual, and movement characteristic data of the moving individual.

Optionally, the dynamic spatio-temporal behavior data of a moving individual further comprises: a moving distance between sampling points.

Optionally, after the step of receiving matching information sent by the server, the method further comprises: determining whether the moving individual has performed an operation on the matching information; and if yes, sending the matching information on which the operation has been performed to the server.

Accordingly, an embodiment of the present application further provides an apparatus for collecting behavioral information of a moving individual, comprising: a dynamic spatio-temporal behavioral information acquisition unit, a sending unit, and a receiving unit, wherein the dynamic spatio-temporal behavioral information acquisition unit is configured to acquire dynamic spatio-temporal behavior data of a moving individual; the sending unit is configured to send the dynamic spatio-temporal behavior data of a moving individual to a server; and the receiving unit is configured to receive matching information sent by the server.

Optionally, the apparatus for collecting behavioral information of a moving individual further comprises: a static information acquisition unit and a static information sending unit, wherein the static information acquisition unit is configured to acquire static information of the moving individual, wherein the static information at least comprises profile information of the moving individual; and when the moving individual has a transportation vehicle, the static information may further comprise vehicular information of the transportation vehicle owned by the moving individual; and the static information sending unit is configured to send the static information of the moving individual to the server.

Optionally, the dynamic spatio-temporal behavioral information acquisition unit is specifically configured to acquire region positioning information reflecting a location of the moving individual and time information reflecting an information generation time; and at least one of the following behavioral information reflecting a behavioral state of the moving individual: physiological characteristic data of the moving individual, and movement characteristic data of the moving individual.

Optionally, the dynamic spatio-temporal behavioral information acquisition unit further comprises: a moving distance acquisition unit, wherein the moving distance acquisition unit is configured to acquire a moving distance between sampling points.

Optionally, the apparatus for collecting behavioral information of a moving individual further comprises: a matching information determining unit and a sending unit, wherein the matching information determining unit is configured to determine whether the moving individual has performed an operation on the matching information; and the sending unit is configured to receive a result of the matching information determining unit, and send the matching information on which the operation has been performed to the server.

In addition, an embodiment of the present application further provides a system for pushing information, comprising the apparatus for pushing information according to any item above and the apparatus for collecting behavioral information of a moving individual according to any item above.

In addition, an embodiment of the present application further provides an electronic device, comprising: a display; a processor; and a memory, configured to store the following program: when the program is read and executed by the processor, performs the following operations: receiving dynamic spatio-temporal behavior data of a moving individual; analyze historical dynamic spatio-temporal behavior data of the moving individual to acquire time- and space-related behavioral characteristics of the moving individual; determining appropriate information as matching information for the moving individual according to the spatio-temporal behavioral characteristics of the moving individual in combination with dynamic spatio-temporal behavior data of the moving individual at a current time; and sending the matching information to the moving individual.

The beneficial effects of the technical solutions provided in the disclosed embodiments are the following.

In one embodiment, the method for pushing information comprises: receiving dynamic spatio-temporal behavior data of a moving individual; analyzing historical dynamic spatio-temporal behavior data of the moving individual to acquire spatio-temporal behavioral characteristics of the moving individual; determining appropriate information as matching information for the moving individual according to the spatio-temporal behavioral characteristics of the moving individual in combination with dynamic spatio-temporal behavior data of the moving individual at a current time; and sending the matching information to the moving individual. Behavioral characteristics of a moving individual are analyzed to obtain habit and preference characteristics of the moving individual and targeted push information is sent, wherein the behavioral characteristics include characteristics such as clock-in and clock-out time and locations of the moving individual, a short break time and location of the moving individual, and dining time and locations, etc. According to the aforementioned method, dynamic spatio-temporal behavior data of the moving individual is deeply mined, thereby solving the problem of pushed information having less diversified, targeted and accurate content.

BRIEF DESCRIPTION OF THE DRAWINGS

In order to more clearly illustrate the technical schemes in the embodiments of the disclosed embodiments, the drawings which need to be used in the description of the embodiments or the prior art will be introduced briefly below. The drawings described below are merely some embodiments disclosed herein, and those of ordinary skills in the art also can derive other drawings according to these drawings.

DETAILED DESCRIPTION

To make the above-mentioned objects, features, and advantages of the disclosed embodiments clear and easy to understand, the embodiments are further described below in detail in conjunction with the accompanying figures and the detailed description. It should be noted that embodiments and features in the embodiments can be combined with each other without conflict.

Many specific details are set forth in the following description to facilitate full understanding of the disclosed embodiments. However, the disclosed embodiments can be implemented in many other manners than those described herein. Those skilled in the art can make similar variations without departing from the essence of the disclosure. Therefore the disclosure is not intended to be limited by the following disclosed embodiments.

Embodiments of the disclosure provide a method for pushing information, an apparatus for pushing information, and a system for pushing information. The disclosure further provides a method for collecting behavioral information of a moving individual and an apparatus for collecting behavioral information of a moving individual. The disclosure also provides an electronic device for performing the same. Detailed descriptions are provided in the embodiments below.

Figure 1A:
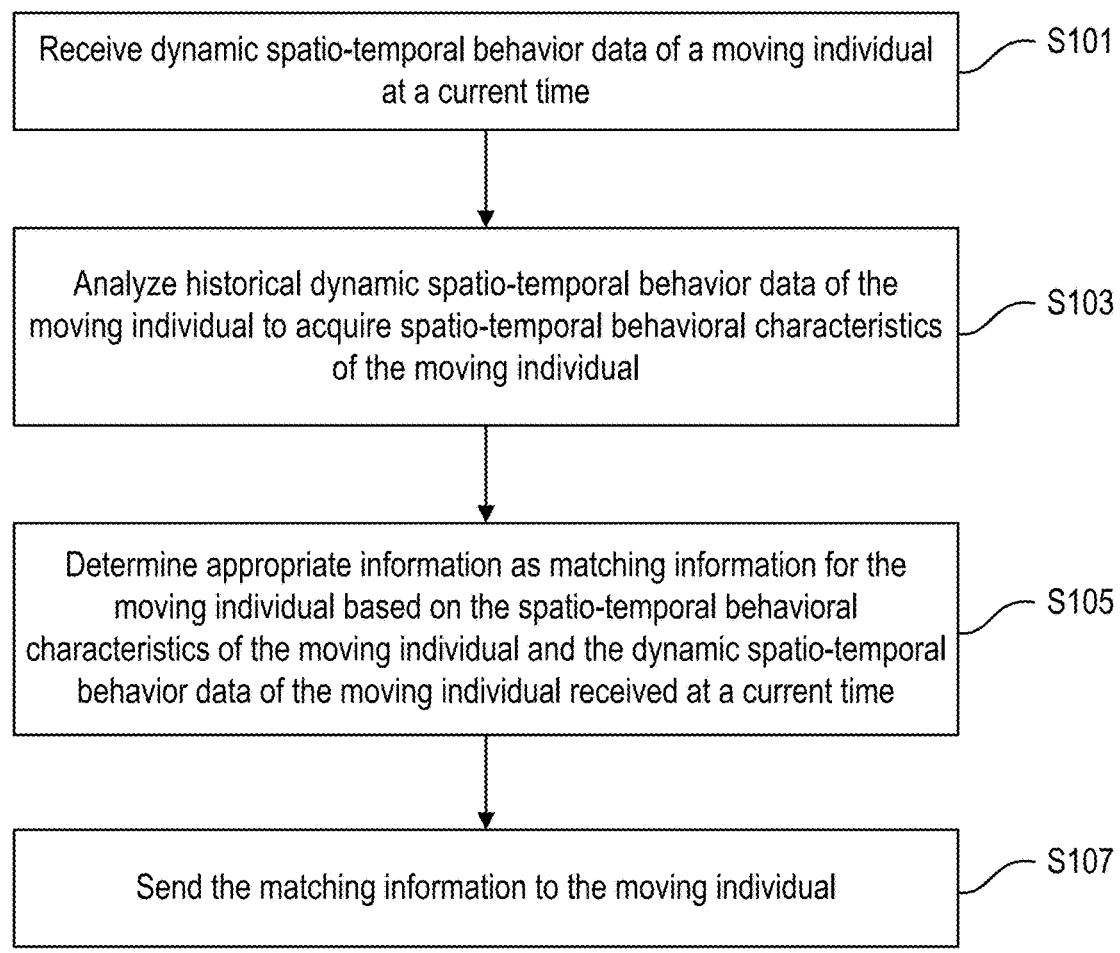
FIG. 1A is a flow diagram illustrating a method for pushing information according to some embodiments of the disclosure.

FIG. 1A is a flow diagram illustrating a method for pushing information according to some embodiments of the disclosure.

In general, the method for pushing information in this embodiment is carried out by a server. In the method, dynamic spatio-temporal behavior data of a moving individual is received at a current time by means of wireless communication; analysis is conducted according to historical dynamic spatio-temporal behavior data of the moving individual to acquire spatio-temporal behavioral characteristics of the moving individual; appropriate information is determined as matching information for the moving individual according to the spatio-temporal behavioral characteristics of the moving individual in combination with dynamic spatio-temporal behavioral data of the moving individual at a current time; and the matching information is sent to the moving individual.

The method for pushing information includes the following steps.

Step S101: receive dynamic spatio-temporal behavior data of a moving individual at a current time.

In one embodiment, dynamic spatio-temporal behavior data of a moving individual includes region positioning information reflecting a location of the moving individual and time information reflecting an information generation time.

In one embodiment, time information reflecting the information generation time is a corresponding time point when the dynamic spatio-temporal behavior data is generated. Alternatively, or in conjunction with the foregoing, the region positioning information reflecting the location of the moving individual may be latitude and longitude information of the location of the moving individual or a Geohash (a kind of address coding) string of the location of the moving individual. Certainly, the region positioning information reflecting the location of the moving individual may be generated using a geographic location positioning method that uses a landmark such as a specific building as a mark.

For example, the dynamic spatio-temporal behavior data of the moving individual may be specifically obtained by a positioning device located on a transportation vehicle, or by an apparatus for collecting behavioral information of a moving individual. In another embodiment, the dynamic spatio-temporal behavior data may also be obtained by the positioning device combined with the apparatus for collecting behavioral information of a moving individual. Those skilled in the art may configure the positioning device and the apparatus for collecting behavioral information of a moving individual according to specific behavioral characteristic parameters. Additionally, the dynamic spatio-temporal behavior data of the moving individual may also be obtained in other manners depending on different devices for acquiring dynamic spatio-temporal behavior data of a moving individual. For example, a pressure sensor is provided on the seat of a transportation vehicle, wherein the dynamic spatio-temporal behavior data of the moving individual is acquired by the pressure sensor and the time information is acquired through a startup time of the transportation vehicle or through a time of connection from a Bluetooth device in the transportation vehicle to a mobile terminal carried by the moving individual. In one embodiment, region positioning information of the region where the moving individual is located is acquired by the mobile terminal.

In one embodiment, prior to the step of receiving dynamic spatio-temporal behavior data of a moving individual at a current time, the method further includes receiving static information of the moving individual, wherein the static information at least comprises profile information of the moving individual. If the moving individual has a transportation vehicle, the static information may further comprise vehicular information of the transportation vehicle owned by the moving individual.

For example, the profile information of the moving individual may be the height, weight, age, birthplace, occupation, hobbies, dietary habits, and so on, of the user. The vehicular information of the transportation vehicle owned by the moving individual may be the model, quantity, brand, and so on of the transportation vehicle. The static information of the moving individual may be specifically acquired through profile or vehicular information previously provided by the moving individual, or, may be profile information of the moving individual and vehicular information of the transportation vehicle owned by the moving individual that are obtained from a third-party data source. For example, the third-party data source may be historical information generated from the moving individual's browsing behavior, keywords in information querying, and registration information left in applications.

In one embodiment, after the step of receiving static information of the moving individual, behavioral characteristics of the moving individual may further be preferably acquired according to the static information. For example, dining habits of the moving individual are acquired from the profile information of the moving individual, or clock-in and clock-out time and dining time of the moving individual may be deduced according to the moving individual's occupation.

In one embodiment, the dynamic spatio-temporal behavior data of a moving individual further comprises a moving distance between sampling points. The moving distance between sampling points refers to an actual moving distance of the moving individual each time the server receives the dynamic spatio-temporal behavior data of the moving individual. In one embodiment, a refueling interval for the transportation vehicle owned by the moving individual is calculated according to the moving distance.

In some embodiments, receiving dynamic spatio-temporal behavior data of a moving individual may be performed in one of two ways. In one embodiment, the apparatus for collecting behavioral information of a moving individual sends dynamic spatio-temporal behavior data of a moving individual to the server at a specific time interval (e.g., every two or five minutes). Alternatively, or in conjunction with the foregoing, the apparatus for collecting behavioral information of a moving individual sends dynamic spatio-temporal behavior data of a moving individual to the server in real time by means of wireless communication. In this embodiment, the apparatus for collecting behavioral information of a moving individual may send dynamic spatio-temporal behavior data of a moving individual appearing or disappearing to the server at the time when the apparatus for collecting behavioral information of a moving individual detects that the moving individual appears or disappears. Notably, this embodiment can reduce the communication frequency performed between the apparatus for collecting behavioral information of a moving individual and the server; and reduce energy consumption for both parties.

Step S103: analyze historical dynamic spatio-temporal behavior data of the moving individual to acquire spatio-temporal behavioral characteristics of the moving individual.

In one embodiment, spatio-temporal behavioral characteristics comprises at least one of the following behavioral characteristics: clock-in and clock-out time of the moving individual, clock-in and clock-out locations of the moving individual, a short break time of the moving individual, and a short break location of the moving individual.

Figure 1B:
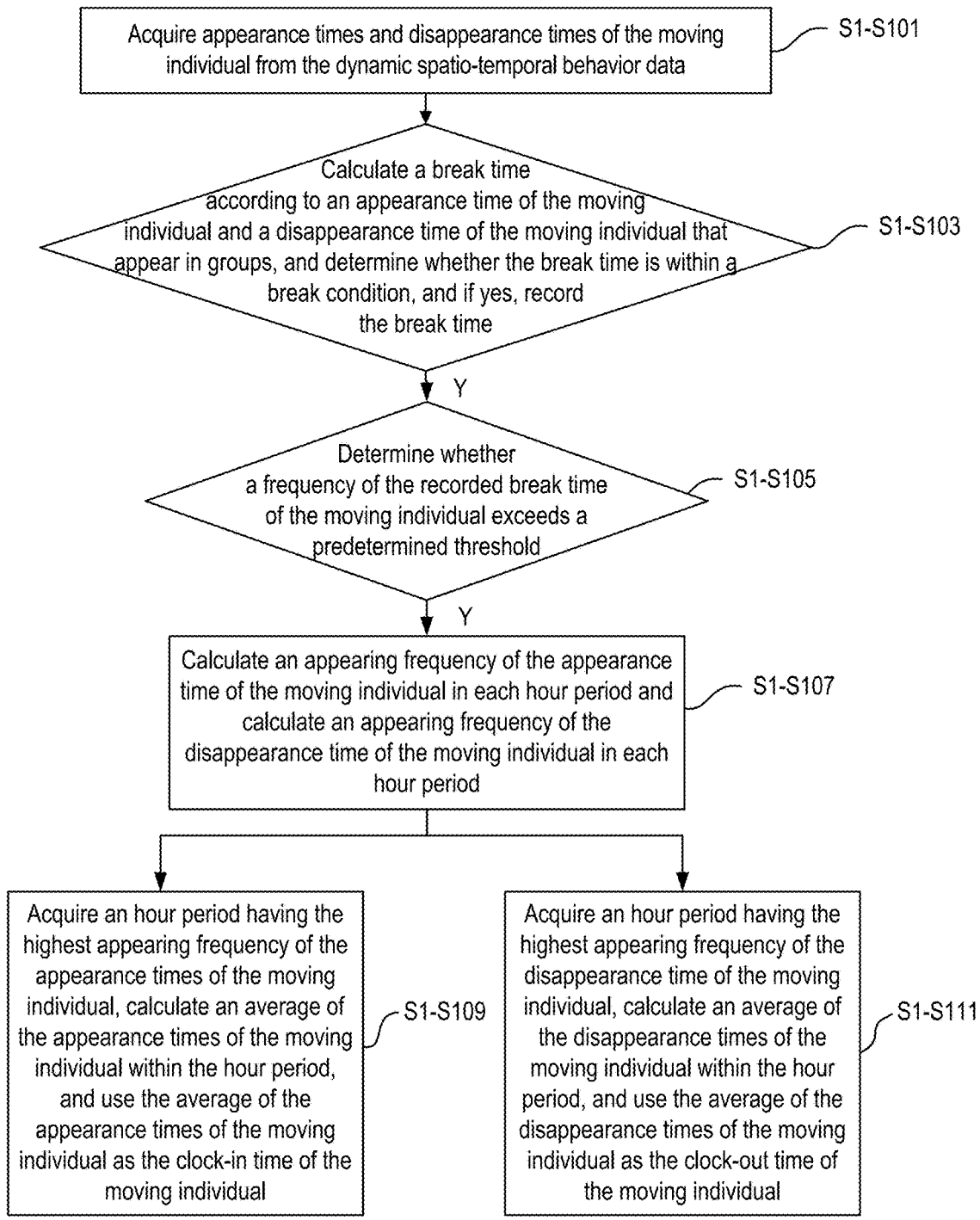
FIG. 1B is a flow diagram illustrating a method for calculating a clock-in and clock-out time of a moving individual according to some embodiments of the disclosure.

FIG. 1B is a flow diagram illustrating a method for calculating a clock-in and clock-out time of a moving individual according to some embodiments of the disclosure.

In one embodiment, a method for calculating the clock-in and clock-out time (e.g., working hours) of the moving individual specifically includes the following steps.

Step S1-101: acquire appearance times and disappearance times of the moving individual from the dynamic spatio-temporal behavior data.

In one embodiment, step S1-101 may comprise acquiring, from the dynamic spatio-temporal behavior data, appearing and disappearing time information of each group of dynamic spatio-temporal behavior data. For example, two groups of dynamic spatio-temporal behavior data exist. Time information of appearance of the first group of dynamic spatio-temporal behavior data is marked as $t_{r1}$; time information of disappearance of the first group of dynamic spatio-temporal behavior data is marked as $t_{i1}$; time information of appearance of the second group of dynamic spatio-temporal behavior data is marked as $t_{r2}$; and time information of disappearance of the second group of dynamic spatio-temporal behavior data is marked as $t_{i2}$.

Step S1-103: calculate a break time according to an appearance time of the moving individual and a disappearance time of the moving individual that appear in groups, and determine whether the break time is within a break condition, and if yes, record the break time.

In one embodiment, step S1-103 may comprise calculating a break time of the moving individual by using an appearance time of the moving individual and a previous disappearance time of the moving individual, and determining whether the break time is within a break condition; and if yes, recording this group of appearance time and disappearance time of the moving individual. For example, a current break time $t_{rest1}$ of the moving individual is acquired by subtracting the time information $t_{i1}$ of disappearance of the first group of dynamic spatio-temporal behavior data from the time information $t_{r2}$ of appearance of the second group of dynamic spatio-temporal behavior data; and it is determined whether $t_{rest1}$ is within a length of a break condition of 12 hours to 16 hours. If yes, this group of appearance time and disappearance time of the moving individual is recorded. In one embodiment, determining whether the break time is within a break condition is to compare a length of the break time with a time length specified by the break condition. If the length of the break time is within the time length specified by the break condition, determining that the break time is within the break condition. In one embodiment, the time length specified by the break condition is 12 hours to 16 hours.

Step S1-105: determine whether a frequency of the recorded break time of the moving individual exceeds a predetermined threshold.

In determining whether a frequency of the recorded break time of the moving individual exceeds a predetermined threshold, the predetermined threshold is four. For example, it is determined whether the frequency of $t_{rest}$ exceeds four.

Step S1-107: if the predetermined threshold in Step S1-105 is exceeded, calculate an appearing frequency of the appearance time of the moving individual in each hour period and calculate an appearing frequency of the disappearance time of the moving individual in each hour period.

In one embodiment, step S1-107 may comprise calculating the appearing frequencies of the recorded appearance time and disappearance time of the moving individual in each hour period. For example, if the recorded appearance times of the moving individual is $t_{r1}$ of 7:30, $t_{r2}$ of 7:45, $t_{r3}$ of 7:52, and $t_{r4}$ of 8:10, then the appearing frequency in $C_7$ is 3 and the appearing frequency in $C_8$ is 1. If the recorded disappearance times of the moving individual are $t_{i2}$ of 22:30, $t_{i3}$ of 22:45, $t_{i4}$ of 22:52, and $t_{i5}$ of 23:10, then the disappearing frequency in $C_{22}$ is 3 and the disappearing frequency in $C_{23}$ is 1.

Step S1-109: acquire an hour period having the highest appearing frequency of the appearance times of the moving individual, calculate an average of the appearance times of the moving individual within the hour period, and use the average of the appearance times of the moving individual as the clock-in time of the moving individual.

In one embodiment, step S1-109 comprises acquiring appearance time $t_r$ in an hour period $C_m^{(max)}$ having the highest appearing frequency for the moving individual, calculating an average of $t_r$ according to $t_{ravg}=Avg(t_{r(n)}^{(m)})$; and using the average $t_{ravg}$ as the clock-in time of the moving individual. For example, if the hour period having the highest appearing frequency of the appearance time of the moving individual is $C_7$, then an average $t_{ravg}$ of $t_{r1}$, $t_{r2}$, and $t_{r3}$ is calculated, and the average ($t_{ravg}$), in this example, is 7:42.

Step S1-111: acquire an hour period having the highest appearing frequency of the disappearance times of the moving individual, calculate an average of the disappearance times of the moving individual within the hour period, and use the average of the disappearance times of the moving individual as the clock-out time of the moving individual.

In one embodiment, step S1-111 comprises acquiring disappearance time $t_i$ in an hour period $C_m^{(max)}$ having the highest disappearing frequency for the moving individual; calculating an average of $t_i$ according to $t_{iavg}=Avg(t_{i(n)}^{(m)})$; and using the average $t_{iavg}$ as the clock-out time of the moving individual. For example, if the hour period having the highest disappearing frequency of the moving individual is $C_{22}$, then an average $t_{iavg}$ of $t_{i2}$, $t_{i3}$, and $t_{i4}$ is calculated, and the average ($t_{iavg}$), in this example, is 10:42.

Through these steps, dynamic spatio-temporal behavior data of a moving individual is deeply mined, and clock-in and clock-out times of the moving individual are calculated according to time information in the dynamic spatio-temporal behavior data of the moving individual.

Figure 1C:
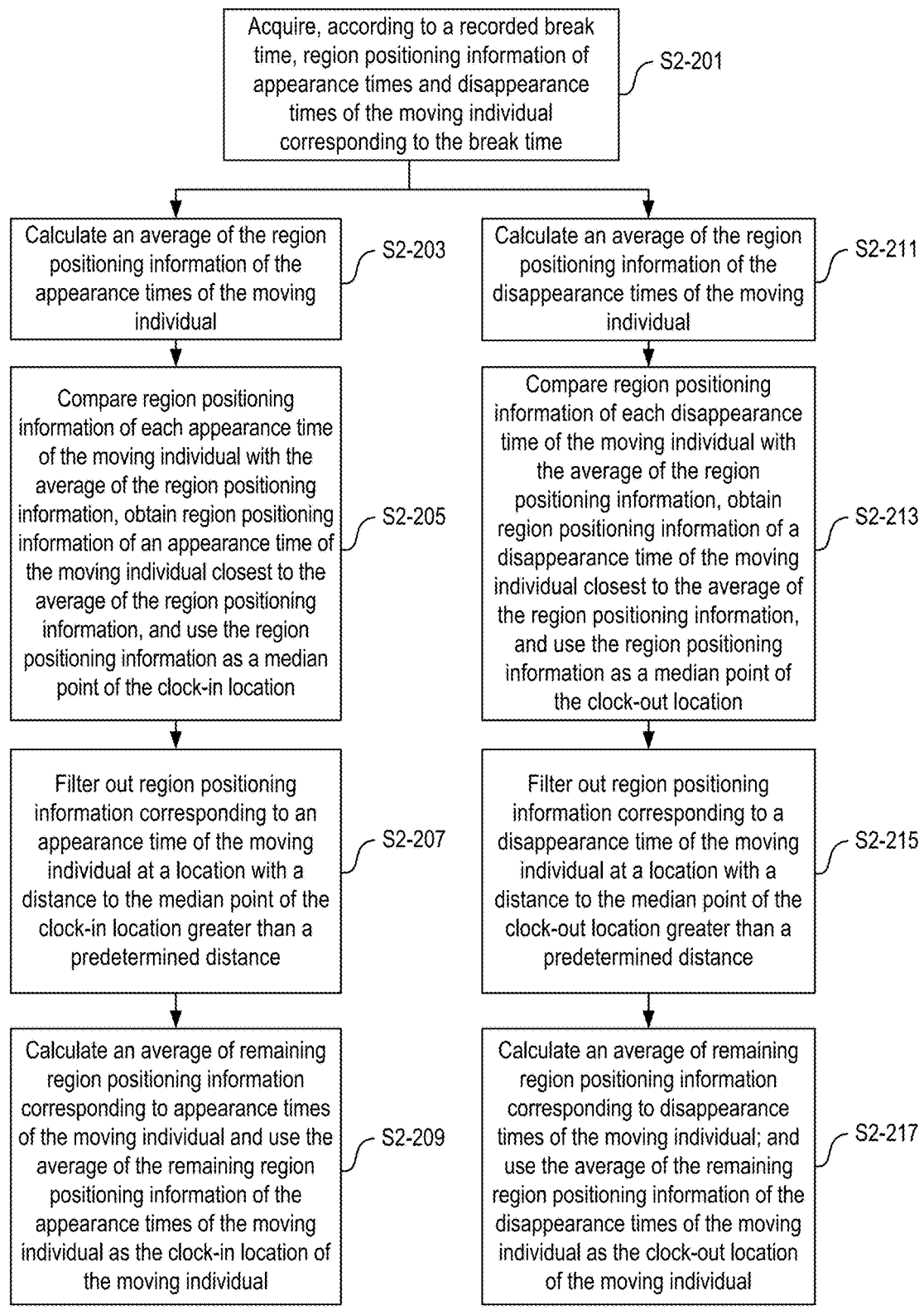
FIG. 1C is a flow diagram illustrating a method for calculating the clock-in and clock-out locations of the moving individual according to some embodiments of the disclosure.

FIG. 1C is a flow diagram illustrating a method for calculating the clock-in and clock-out locations of the moving individual according to some embodiments of the disclosure.

It should be noted that in one embodiment, after calculating the clock-in and clock-out time of the moving individual, the clock-in and clock-out locations of the moving individual further need to be calculated, and the method for calculating the clock-in and clock-out locations of the moving individual may comprise the following steps.

Step S1-201: acquire, according to a recorded break time, region positioning information of appearance times and disappearance times of the moving individual corresponding to the break time.

In one embodiment, step S1-201 may comprise acquiring corresponding region positioning information according to appearance times and disappearance times of the moving individual corresponding to the recorded rest time. For example, if recorded $t_{rest}$ includes $t_{rest1}$, $t_{rest2}$, $t_{rest3}$, and $t_{rest4}$, then the corresponding appearance times of the moving individual are $t_{r2}$, $t_{r3}$, $t_{r4}$, and $t_{r5}$; the corresponding disappearance times of the moving individual are $t_{i1}$, $t_{i2}$, $t_{i3}$, and $t_{i4}$; and the region positioning information $x_{r2}$, $x_{r3}$, $x_{r4}$, and $x_{r5}$ corresponding to $t_{r2}$, $t_{r3}$, $t_{r4}$, and $t_{r5}$ and the region positioning information $x_{i1}$, $x_{i2}$, $x_{i3}$, and $x_{i4}$ corresponding to $t_{i1}$, $t_{i2}$, $t_{i3}$, and $t_{i4}$ are acquired from the dynamic spatio-temporal behavior data. The region positioning information may be latitude and longitude information or a Geohash string of a location of the moving individual.

According to the aforementioned information, the clock-in location of the moving individual is obtained through the following steps.

Step S1-203: calculate an average of the region positioning information of the appearance times of the moving individual.

In one embodiment, step S1-203 may comprise acquiring the region positioning information $x_r$ of the appearance time of the moving individual, and calculating an average of $x_r$ according to $x_{ravg}=Avg(x_{r(n)})$. For example, if the region positioning information is latitude and longitude information, then an average of $x_{r2(50°, 60°)}$, $x_{r3(55°, 65°)}$, $x_{r4(58°, 68°)}$, and $x_{r5(57°, 67°)}$ is calculated; and the average $x_{ravg}$ is (55°, 65°).

Step S1-205: compare region positioning information of each appearance time of the moving individual with the average of the region positioning information, obtain region positioning information of an appearance time of the moving individual closest to the average of the region positioning information, and use the region positioning information as a median point of the clock-in location.

In one embodiment, step S1-205 may comprise calculating differences between the region positioning information $x_r$ of the appearance time of the moving individual and the average $x_{ravg}$, and acquiring an $x_r$ closest to $x_{ravg}$ according to $x_{(n)}^{temp}=\min(Dist(x_r,x_{ravg}))$. For example, if the distance between $x_{r2}$ and $x_{ravg}$ is 7; the distance between $x_{r3}$ and $x_{ravg}$ is 0; the distance between $x_{r4}$ and $x_{ravg}$ is 4; and the distance between $x_{r5}$ and $x_{ravg}$ is 2800, then the median point is $x_{r3}$.

Step S1-207: filter out region positioning information corresponding to an appearance time of the moving individual at a location with a distance to the median point of the clock-in location greater than a predetermined distance.

In one embodiment, step S1-207 may comprise calculating distances between the median point of the clock-in location and the region positioning information corresponding to the appearance time of the moving individual; and removing region positioning information corresponding to a disappearance time of the moving individual whose distance is greater than a predetermined distance according to Dist $(x_r,x_{(n)}^{temp})>1000$. For example, if the distance between $x_{r2}$ and $x_{ravg}$ is 7; the distance between $x_{r3}$ and $x_{ravg}$ is 0; the distance between $x_{r4}$ and $x_{ravg}$ is 4; and the distance between $x_{r5}$ and $x_{ravg}$ is 2800; and the distance between $x_{r5}$ and $x_{ravg}$ is greater than 1000; then $x_{r5}$ is removed. In one embodiment, the predetermined distance is 1000 meters.

Step S1-209: calculate an average of remaining region positioning information corresponding to appearance times of the moving individual and use the average of the remaining region positioning information of the appearance times of the moving individual as the clock-in location of the moving individual.

In one embodiment, step S1-209 may comprise calculating an average of remaining region positioning information corresponding to appearance times of the moving individual according to $x_{ravg'}=Avg(x_{r(n)})$, and using the average $x_{ravg'}$ as the clock-in location of the moving individual.

The clock-out location of the moving individual is obtained through the following steps.

Step S1-211: calculate an average of the region positioning information of the disappearance times of the moving individual.

Step S1-213: compare region positioning information of each disappearance time of the moving individual with the average of the region positioning information, obtain region positioning information of a disappearance time of the moving individual closest to the average of the region positioning information, and use the region positioning information as a median point of the clock-out location.

Step S1-215: filter out region positioning information corresponding to a disappearance time of the moving individual at a location with a distance to the median point of the clock-out location greater than a predetermined distance.

Step S1-217: calculate an average of remaining region positioning information corresponding to disappearance times of the moving individual; and use the average of the remaining region positioning information of the disappearance times of the moving individual as the clock-out location of the moving individual.

It should be noted that the method for calculating the clock-out location of the moving individual is similar to the method for calculating the clock-in location of the moving individual. Additional detail on the specific steps was previously illustrated in the aforementioned method for calculating the clock-in location of the moving individual and therefore will not be repeated herein, but is incorporated by reference in their entirety.

Through these steps, dynamic spatio-temporal behavior data of a moving individual is mined deeply, and clock-in and clock-out locations of the moving individual are calculated according to region positioning information in the dynamic spatio-temporal behavior data of the moving individual.

Figure 1D:
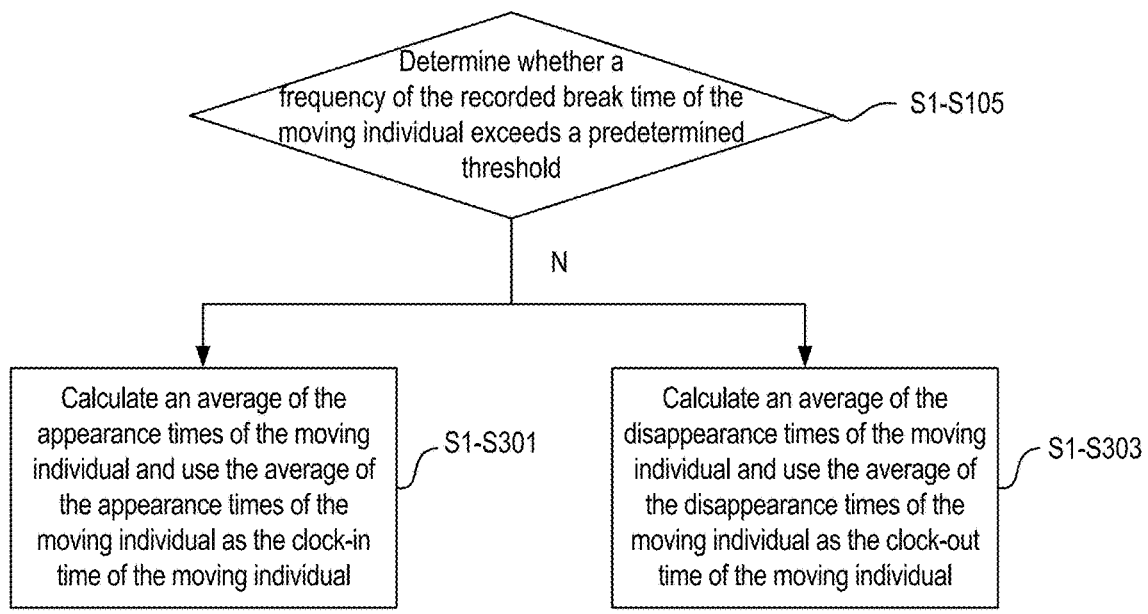
FIG. 1D is a flow diagram illustrating a method for calculating the clock-in and clock-out time of the moving individual according to some embodiments of the disclosure.

FIG. 1D is a flow diagram illustrating a method for calculating the clock-in and clock-out time of the moving individual according to some embodiments of the disclosure.

It should be noted that in the step of determining whether a frequency of the recorded break time of the moving individual exceeds a predetermined threshold, if the determination result is not exceeded, the following steps are performed.

Step S1-301: calculate an average of the appearance times of the moving individual and use the average of the appearance times of the moving individual as the clock-in time of the moving individual.

In one embodiment, step S1-301 may comprise calculating an average of appearance times of the moving individual according to $t_{ravg}=Avg(t_{r(n)})$, and using the average $t_{ravg}$ as the clock-in time of the moving individual. For example, if the recorded appearance times of the moving individual is $t_{r1}$ of 7:30 and $t_{r2}$ of 7:45, then the average $t_{ravg}$ is 7:37.

Step S1-303: calculate an average of the disappearance times of the moving individual and use the average of the disappearance times of the moving individual as the clock-out time of the moving individual.

It should be noted that in determining whether a frequency of the recorded break time of the moving individual exceeds a predetermined threshold, the predetermined threshold is four. For example, it is determined whether the frequency of $t_{rest}$ exceeds four.

It should be noted that the method for calculating the clock-out time of the moving individual in step S1-303 is consistent with the method for calculating the clock-in time of the moving individual in step S1-301. Details can be seen by referring to the aforementioned method for calculating the clock-in time of the moving individual in step S1-301, therefore will not be described herein.

Through these steps, dynamic spatio-temporal behavior data of a moving individual is mined deeply, and clock-in and clock-out times of the moving individual are calculated according to time information in the dynamic spatio-temporal behavior data of the moving individual.

Figure 1E:
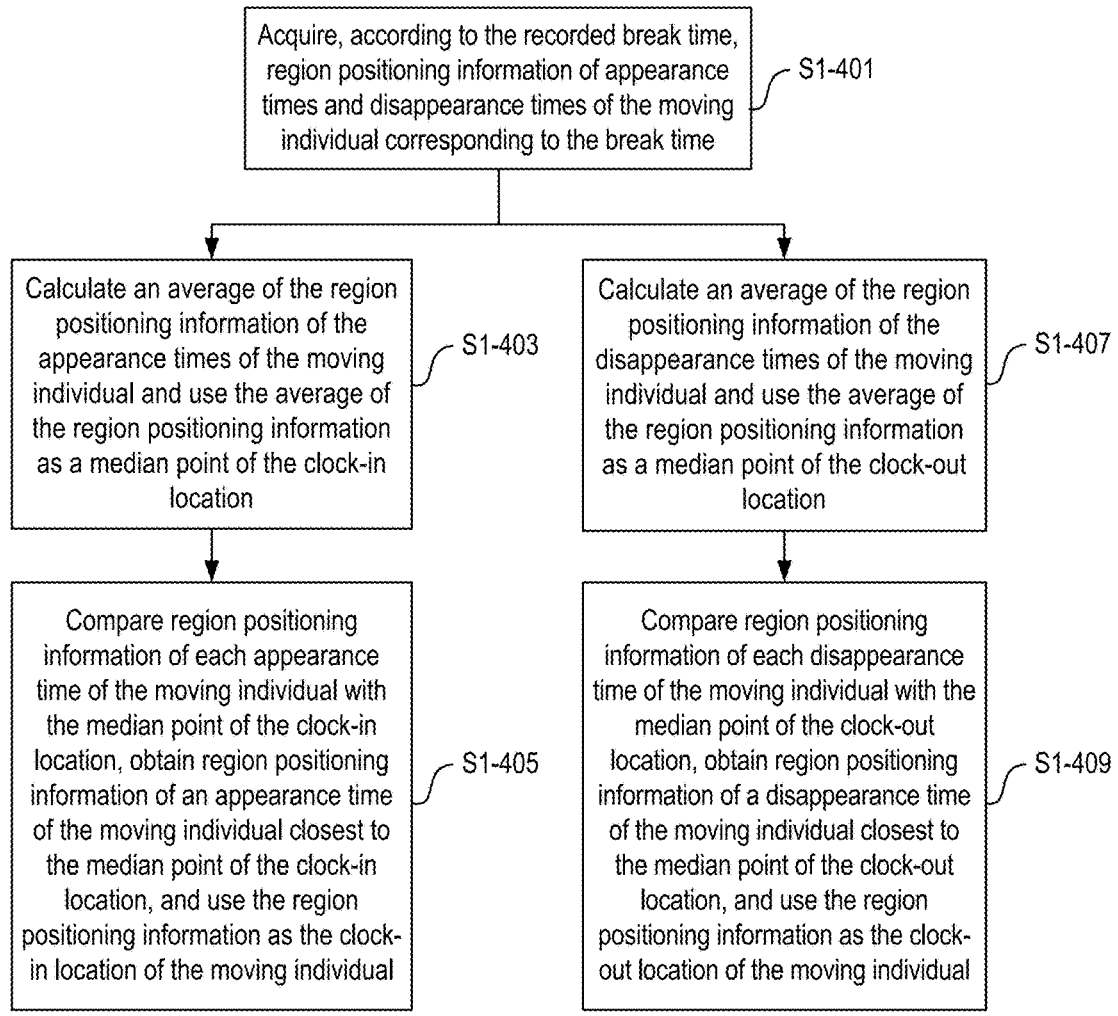
FIG. 1E is a flow diagram illustrating a method for calculating the clock-in and clock-out locations of the moving individual according to some embodiments of the disclosure.

FIG. 1E is a flow diagram illustrating a method for calculating the clock-in and clock-out locations of the moving individual according to some embodiments of the disclosure.

It should be noted that after the step of calculating the clock-in and clock-out time of the moving individual, the clock-in and clock-out locations of the moving individual further need to be calculated, and the method for calculating the clock-in and clock-out locations of the moving individual may comprise.

Step S1-401: acquire, according to the recorded break time, region positioning information of appearance times and disappearance times of the moving individual corresponding to the break time.

In one embodiment, step S1-401 may comprise acquiring corresponding region positioning information according to appearance times and disappearance times of the moving individual corresponding to the recorded rest time. For example, if the recorded $t_{rest}$ includes $t_{rest1}$ and $t_{rest2}$, then the corresponding appearance times of the moving individual are $t_{r2}$ and $t_{r3}$; the corresponding disappearance times of the moving individual are $t_{i1}$ and $t_{i2}$; and region positioning information $x_{r2}$ and $x_{r3}$ corresponding to $t_{r2}$ and $t_{r3}$ and region positioning information $x_{i1}$ and $x_{i2}$ corresponding to $t_{i1}$ and $t_{i2}$ are acquired from the dynamic spatio-temporal behavior data. The region positioning information may be latitude and longitude information or a Geohash string of a location of the moving individual.

According to the aforementioned information, the clock-in location of the moving individual is obtained through the following steps.

Step S1-403: calculate an average of the region positioning information of the appearance times of the moving individual and use the average of the region positioning information as a median point of the clock-in location.

In one embodiment, step S1-403 may comprise acquiring the region positioning information $x_r$ of appearance time of the moving individual, and calculating a median point of $x_r$ according to $x_{ravg}=Avg(X_{r(n)})$. For example, if the region positioning information is latitude and longitude information, then an average of $x_{r2(51°, 61°)}$ and $x_{r3(55°, 65°)}$ is calculated, and the median point $x_{ravg}$ is (53°, 63°).

Step S1-405: compare region positioning information of each appearance time of the moving individual with the median point of the clock-in location, obtain region positioning information of an appearance time of the moving individual closest to the median point of the clock-in location, and use the region positioning information as the clock-in location of the moving individual.

In one embodiment, step S1-405 may comprise calculating differences between the region positioning information $x_r$ of the appearance time of the moving individual and the median point $x_{ravg}$; and acquiring an $x_r$ closest to $x_{ravg}$ according to $x_{(n)}^{temp}=\min(Dist(x_r, x_{ravg}))$; and using the $x_r$ closest to $x_{ravg}$ as the clock-in location of the moving individual. For example, if the distance between $x_{r2}$ and $x_{ravg}$ is 7 and the distance between $x_{r3}$ and $x_{ravg}$ is 1, then the clock-in location of the moving individual is $x_{r3}$.

The clock-out location of the moving individual is obtained though the following steps.

Step S1-407: calculate an average of the region positioning information of the disappearance times of the moving individual and use the average of the region positioning information as a median point of the clock-out location.

Step S1-409: compare region positioning information of each disappearance time of the moving individual with the median point of the clock-out location, obtain region positioning information of a disappearance time of the moving individual closest to the median point of the clock-out location, and use the region positioning information as the clock-out location of the moving individual.

It should be noted that the method for calculating the clock-out location of the moving individual is consistent with the method for calculating the clock-in location of the moving individual. Details can be seen by referring to the aforementioned method for calculating the clock-in location of the moving individual and therefore will not be repeated herein, but are incorporated by reference in their entirety.

Through these steps, dynamic spatio-temporal behavior data of a moving individual is mined deeply, and clock-in and clock-out locations of the moving individual are calculated according to region positioning information in the dynamic spatio-temporal behavior data of the moving individual.

Figure 1F:
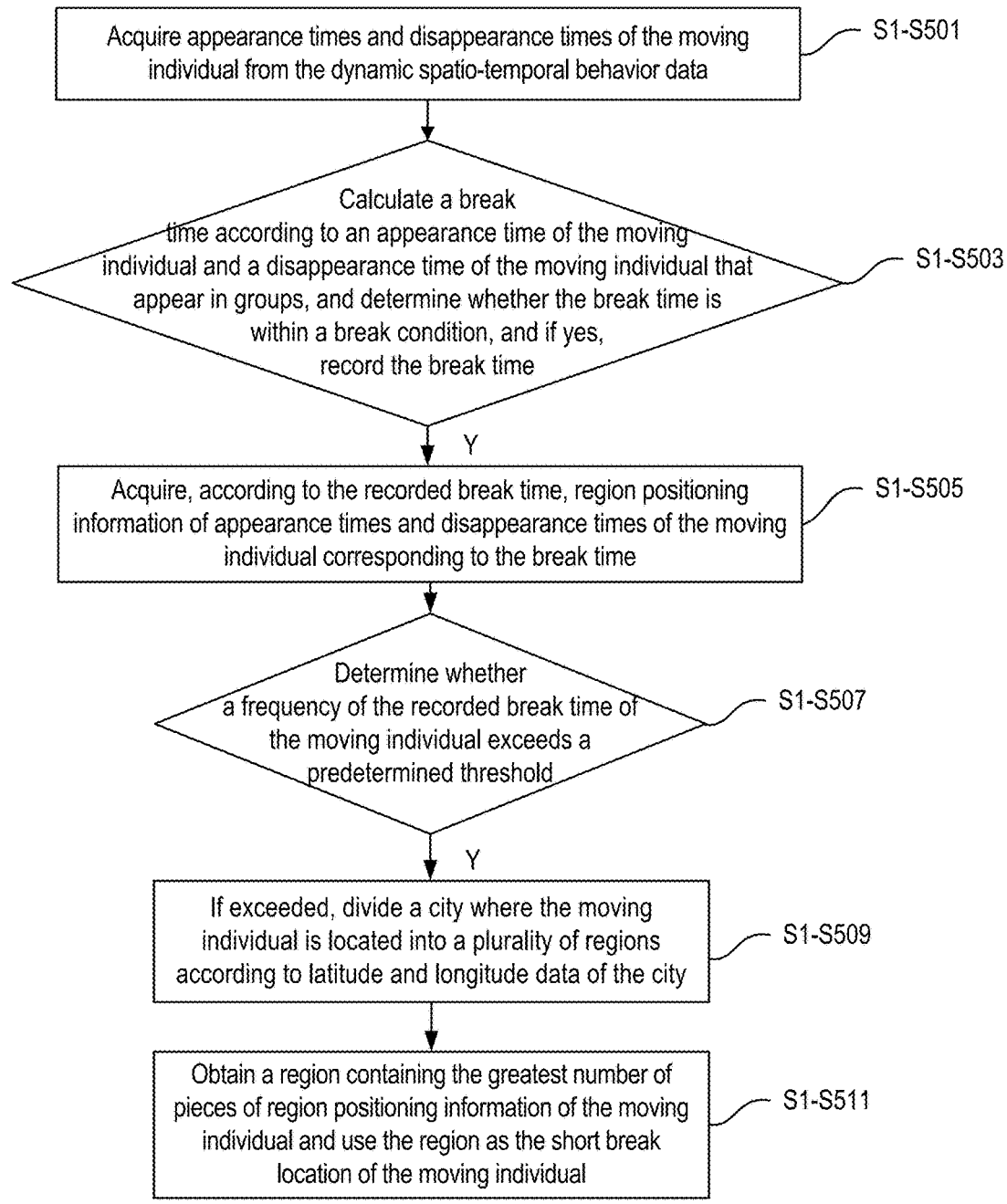
FIG. 1F is a flow diagram illustrating a method for calculating a short break location of a moving individual provided according to some embodiments of the disclosure.

FIG. 1F is a flow diagram illustrating a method for calculating a short break location of a moving individual provided according to some embodiments of the disclosure.

In one embodiment, a method for calculating the short break location of the moving individual may be implemented through the following steps.

Step S1-501: acquire appearance times and disappearance times of the moving individual from the dynamic spatio-temporal behavior data.

In one embodiment, step S1-501 may comprise acquiring, from the dynamic spatio-temporal behavior data, appearing and disappearing time information of each group of dynamic spatio-temporal behavior data. For example, two groups of dynamic spatio-temporal behavior data exist. Time information of appearance of the first group of dynamic spatio-temporal behavior data is marked as $t_{r1}$; time information of disappearance of the first group of dynamic spatio-temporal behavior data is marked as $t_{i1}$; time information of appearance of the second group of dynamic spatio-temporal behavior data is marked as $t_{r2}$; and time information of disappearance of the second group of dynamic spatio-temporal behavior data is marked as $t_{i2}$.

Step S1-503: calculate a break time according to an appearance time of the moving individual and a disappearance time of the moving individual that appear in groups, and determine whether the break time is within a break condition, and if yes, record the break time.

In one embodiment, step S1-503 may comprise calculating a break time of the moving individual by using an appearance time of the moving individual and a previous disappearance time of the moving individual, and determining whether the break time is within a break condition; and if yes, recording this group of appearance time and disappearance time of the moving individual. For example, a current break time $t_{rest1}$ of the moving individual is acquired by subtracting the time information $t_{i1}$ of disappearance of the first group of dynamic spatio-temporal behavior data from the time information $t_{r2}$ of appearance of the second group of dynamic spatio-temporal behavior data; and it is determined whether $t_{rest1}$ is within a length of a break condition of 15 hours to 1 hours; and if yes, this group of appearance time and disappearance time of the moving individual is recorded. Determining whether the break time is within a break condition is to compare a length of the break time with a time length specified by the break condition; and if the length of the break time is within the time length specified by the break condition, determining that the break time is within the break condition. The time length specified by the short break condition is: 15 minutes to 1 hour.

Step S1-505: acquire, according to the recorded break time, region positioning information of appearance times and disappearance times of the moving individual corresponding to the break time.

In one embodiment, step S1-505 may comprise acquiring corresponding region positioning information according to appearance times and disappearance times of the moving individual corresponding to the recorded rest time. For example, if recorded $t_{rest}$ includes $t_{rest1}$, $t_{rest2}$, $t_{rest3}$, and $t_{rest4}$, then the corresponding appearance times of the moving individual are $t_{r2}$, $t_{r3}$, $t_{r4}$, and $t_{r5}$; the corresponding disappearance times of the moving individual are $t_{i1}$, $t_{i2}$, $t_{i3}$, and $t_{i4}$; and the region positioning information $x_{r2}$, $x_{r3}$, $x_{r4}$, and $x_{r5}$ corresponding to $t_{r2}$, $t_{r3}$, $t_{r4}$, and $t_{r5}$ and the region positioning information $x_{i1}$, $x_{i2}$, $x_{i3}$, and corresponding to $t_{i1}$, $t_{i2}$, $t_{i3}$, and $t_{i4}$ are acquired from the dynamic spatio-temporal behavior data. The region positioning information may be latitude and longitude information or a Geohash string of a location of the moving individual.

Step S1-507: determine whether a frequency of the recorded break time of the moving individual exceeds a predetermined threshold.

In determining whether a frequency of the recorded break time of the moving individual exceeds a predetermined threshold, the predetermined threshold is 4. For example, it is determined whether the frequency of $t_{rest}$ exceeds 4.

Step S1-509: if exceeded, divide a city where the moving individual is located into a plurality of regions according to latitude and longitude data of the city.

It should be noted that in one embodiment, the method for dividing a city where the moving individual is located into a plurality of regions according to latitude and longitude data of the city comprises converting the latitude and longitude data of the city where the moving individual is located into Geohash strings. For example, latitude and longitude data of a latitude of 42.6 and a longitude of −5.6 is converted into a string of 01101 11111 11000 00100 00010. Alternatively, or in conjunction with the foregoing, the latitude and longitude data of the city where the moving individual is located may be converted into Geohash grids, for example, 500 m by 500 m grids.

Step S1-511: obtain a region containing the greatest number of pieces of region positioning information of the moving individual and use the region as the short break location of the moving individual.

In one embodiment, step S1-511 may comprise calculating the number $C_m$ of pieces of region positioning information of the moving individual in each grid; and acquiring a grid having the greatest number of pieces of region positioning information; and using the grid having the greatest number of pieces of region positioning information as the short break location of the moving individual.

Through these steps, dynamic spatio-temporal behavior data of a moving individual is mined deeply, and a short break location of the moving individual is calculated according to time information and region positioning information in the dynamic spatio-temporal behavior data of the moving individual.

Figure 1G:
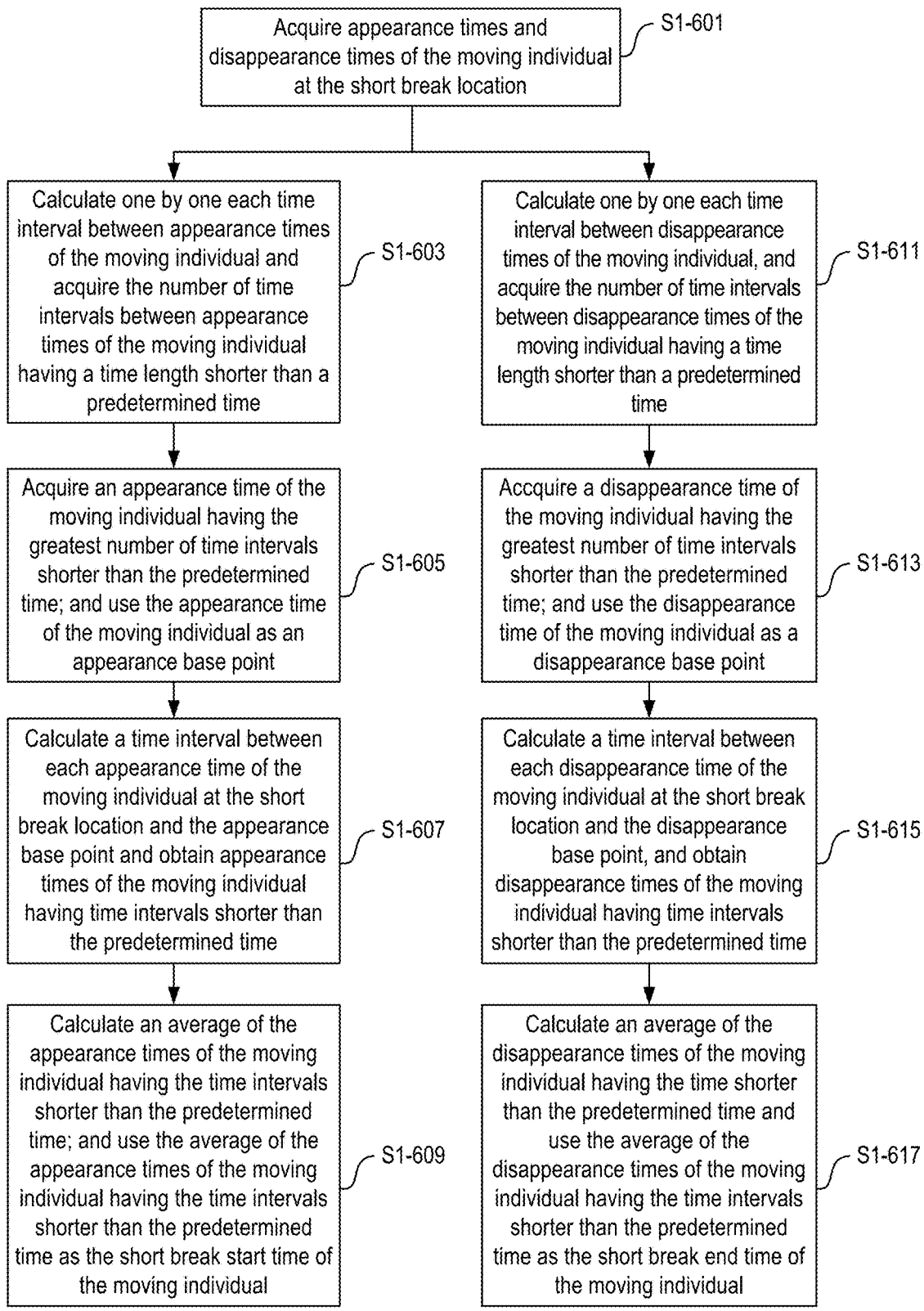
FIG. 1G is a flow diagram illustrating a method for calculating the short break time of the moving individual according to some embodiments of the disclosure.

FIG. 1G is a flow diagram illustrating a method for calculating the short break time of the moving individual according to some embodiments of the disclosure.

It should be noted that after the step of calculating the short break location of the moving individual, the short break time of the moving individual further needs to be calculated, and a method for calculating the short break time of the moving individual may be implemented through the following steps.

Step S1-601: acquire appearance times and disappearance times of the moving individual at the short break location.

In one embodiment, step S1-601 may be implemented through the following steps: acquiring, according to the region positioning information at the short break location, time information corresponding to the region positioning information. For example, if the region positioning information in the grid includes $x_{i1}$, $x_{i2}$, $x_{i3}$, and $x_{r2}$, $x_{r3}$, $x_{r4}$, then time information corresponding to the region positioning information is $t_{i1}$, $t_{i2}$, $t_{i3}$ and $t_{r2}$, $t_{r3}$, $t_{r4}$.

According to the aforementioned information, a short break start time of the moving individual is obtained through the following steps.

Step S1-603: calculate one by one each time interval between appearance times of the moving individual and acquire the number of time intervals between appearance times of the moving individual having a time length shorter than a predetermined time.

In one embodiment, step S1-603 may be implemented through the following steps: calculating one by one each time interval between appearance times of the moving individual; and acquiring the number of time intervals between appearance times of the moving individual having a time length shorter than two hours. For example, if a time interval between $t_{r2}$ and $t_{r3}$ is one hour and a time interval between $t_{r2}$ and $t_{r4}$ is three hours, then the number $C_{r2}^{(<2)}$ of time intervals of $t_{r2}$ less than two hours is one; a time interval between $t_{r3}$ and $t_{r2}$ is one hour; and a time interval between $t_{r3}$ and $t_{r4}$ is two hours; and then the number $C_{r3}^{(<2)}$ of time intervals of $t_{r3}$ shorter than two hours is two. A time length specified by the predetermined time is two hours.

Step S1-605: acquire an appearance time of the moving individual having the greatest number of time intervals shorter than the predetermined time; and use the appearance time of the moving individual as an appearance base point.

Step S1-607: calculate a time interval between each appearance time of the moving individual at the short break location and the appearance base point and obtain appearance times of the moving individual having time intervals shorter than the predetermined time.

In one embodiment, step S1-607 may be implemented through the following steps: calculating a time interval between each appearance time of the moving individual at the short break location and the appearance base point; and obtaining appearance times of the moving individual having time intervals shorter than two hours. For example, if the number $C_{r2}^{(<2)}$ of time intervals of $t_{r2}$ shorter than two hours is one and the number $C_{r3}^{(<2)}$ of time intervals of $t_{r3}$ shorter than two hours is two, then $t_{r3}$ is used as an appearance base point; time intervals between $t_{r2}$ and $t_{r3}$ and between $t_{r4}$ and $t_{r3}$ are calculated; the time interval between $t_{r2}$ and $t_{r3}$ is one hour and the time interval between $t_{r4}$ and $t_{r3}$ is two hours; and then appearance times of the moving individual obtained in this step are $t_{r2}$ and $t_{r4}$.

Step S1-609: calculate an average of the appearance times of the moving individual having the time intervals shorter than the predetermined time; and use the average of the appearance times of the moving individual having the time intervals shorter than the predetermined time as the short break start time of the moving individual.

In one embodiment, step S1-609 may be implemented through the following steps: calculating an average of $t_r$ according to $t_{ravg} = \mathrm{Avg}(t_{r(n)}^{(<2)})$. For example, if the obtained appearance times of the moving individual are $t_{r2}$ and $t_{r4}$, then an average of $t_{r2}$ and $t_{r4}$ is calculated; and the average of $t_{r2}$ and $t_{r4}$ is used as the short break start time of the moving individual.

According to the aforementioned information, a short break end time of the moving individual is obtained through the following steps.

Step S1-611: calculate one by one each time interval between disappearance times of the moving individual, and acquire the number of time intervals between disappearance times of the moving individual having a time length shorter than a predetermined time.

Step S1-613: acquire a disappearance time of the moving individual having the greatest number of time intervals shorter than the predetermined time; and use the disappearance time of the moving individual as a disappearance base point.

Step S1-615: calculate a time interval between each disappearance time of the moving individual at the short break location and the disappearance base point, and obtain disappearance times of the moving individual having time intervals shorter than the predetermined time.

Step S1-617: calculate an average of the disappearance times of the moving individual having the time shorter than the predetermined time and use the average of the disappearance times of the moving individual having the time intervals shorter than the predetermined time as the short break end time of the moving individual.

It should be noted that the method for calculating the short break end time of the moving individual is similar to the method for calculating the short break start time of the moving individual. Thus, details can be seen by referring to the aforementioned method for calculating the short break start time of the moving individual and are not repeated herein, but are incorporated by reference in their entirety.

Through these steps, dynamic spatio-temporal behavior data of a moving individual is mined deeply; and a short break start time and a short break end time of the moving individual are calculated according to time information and region positioning information in the dynamic spatio-temporal behavior data of the moving individual.

Returning to FIG. 1A, the method illustrated therein may include the following steps.

Step S105: determine appropriate information as matching information for the moving individual based on the spatio-temporal behavioral characteristics of the moving individual and the dynamic spatio-temporal behavior data of the moving individual received at a current time.

In one embodiment, determining appropriate information as matching information for the moving individual according to the spatio-temporal behavioral characteristics of the moving individual in combination with dynamic spatio-temporal behavior data of the moving individual at a current time may be implemented through the following steps: (1) acquiring clock-in and clock-out locations and a short break location of the moving individual; (2) querying for shop information and restaurant information in regions where the clock-in and clock-out locations and the short break location are located; and (3) using the shop information and the restaurant information as the matching information of the moving individual.

In one embodiment, it should be noted that the method for determining appropriate information as matching information for the moving individual according to the spatio-temporal behavioral characteristics of the moving individual in combination with dynamic spatio-temporal behavior data of the moving individual at a current time further includes: calculating a refueling interval for the transportation vehicle owned by the moving individual according to a moving distance between sampling points. The moving distance between sampling points refers to an actual moving distance of the moving individual each time the server receives the dynamic spatio-temporal behavior data of the moving individual. A refueling time for the transportation vehicle owned by the moving individual is calculated according to the moving distance.

In one embodiment, in the step of querying for shop information and restaurant information in regions where the clock-in and clock-out locations and the short break location are located, the found shop information and restaurant information may be further screened according to static information of the moving individual by: (1) querying for shop information and restaurant information in regions where the clock-in and clock-out locations and the short break location are located; (2) acquiring behavioral characteristics of the moving individual according to the static information; (3) acquiring shop information and restaurant information matching the behavioral characteristics; and (4) using the shop information and the restaurant information as the matching information of the moving individual.

In one embodiment, the static information includes: profile information of the moving individual and vehicular information of the transportation vehicle owned by the moving individual. The static information of the moving individual may be specifically acquired through profile or vehicular information previously provided by the moving individual; or may be profile information of the moving individual and vehicular information of the transportation vehicle owned by the moving individual that are obtained from a third-party data source. For example, the profile information of the moving individual may be the height, weight, age, birthplace, occupation, hobbies, dietary habits, and so on; the vehicular information of the transportation vehicle owned by the moving individual may be the model, quantity, brand, and so on of the transportation vehicle. The third-party data source may be historical information generated from the moving individual's browsing behavior, keywords in information querying, and registration information left in applications.

In one embodiment, acquiring behavioral characteristics of the moving individual according to the static information may be implemented through the following steps: acquiring dining habits or spending habits of the moving individual from the static information of the moving individual. For example, a taste preference of the moving individual is acquired from the profile information of the moving individual; and restaurant information, meeting the taste preference in the regions where the clock-in and clock-out locations and the short break location are located, is then queried; or according to historical information generated from the moving individual's browsing behavior or keywords in information query, shop information, matching the historical information or keywords in the regions that the clock-in and clock-out locations and the short break location are located, is queried.

In order to improve the efficiency of information query, the spatio-temporal behavioral characteristics of the moving individual may be further classified and query priorities are set according to the classified behavioral characteristics. For example, historical information with high frequency generated from the moving individual's browsing behavior or keywords with high frequency in information query are set to have a high query priority or historical information generated after the moving individual's recent browsing behavior or keywords in information query are set to have a high query priority, which are not limited herein.

Through these steps, the to-be-pushed information is screened according to behavioral characteristics of a moving individual to obtain matching information corresponding to the moving individual, thereby improving the push information quality, providing diversified, targeted, and accurate content.

Step S107: send the matching information to the moving individual.

In one embodiment, it should be noted that after the step of sending the matching information to the moving individual, the method further comprises: receiving matching information on which an operation has been performed by the moving individual; acquiring keywords according to the matching information, wherein the keywords comprise: a commodity type or a restaurant type; querying for matching information matching the keywords; and sending the matching information matching the keywords to the moving individual.

It should be noted that the operation performed by the moving individual on the matching information includes: an operation on the matching information triggered or executed by the moving individual; for example, downloading, adding to Favorites, clicking a "Like" control, listening, and so on. Through these steps, preferences of a moving individual can be further incorporated in the screening process of matching information. Because the matching information of preferences of the moving individual is re-matched, the content of the pushed information may therefore be more diversified, targeted, and accurate.

A method for pushing information is provided in the aforementioned embodiment. In accordance with the aforementioned method for pushing information, the disclosure further provides an apparatus for pushing information. The apparatus embodiment is basically similar to the method embodiment and the description thereof is relatively concise. Reference can be made to the description of the method embodiments for further explanation, the description of the method incorporated herein by reference in its entirety. The apparatus embodiment described below is merely exemplary.

Figure 2:
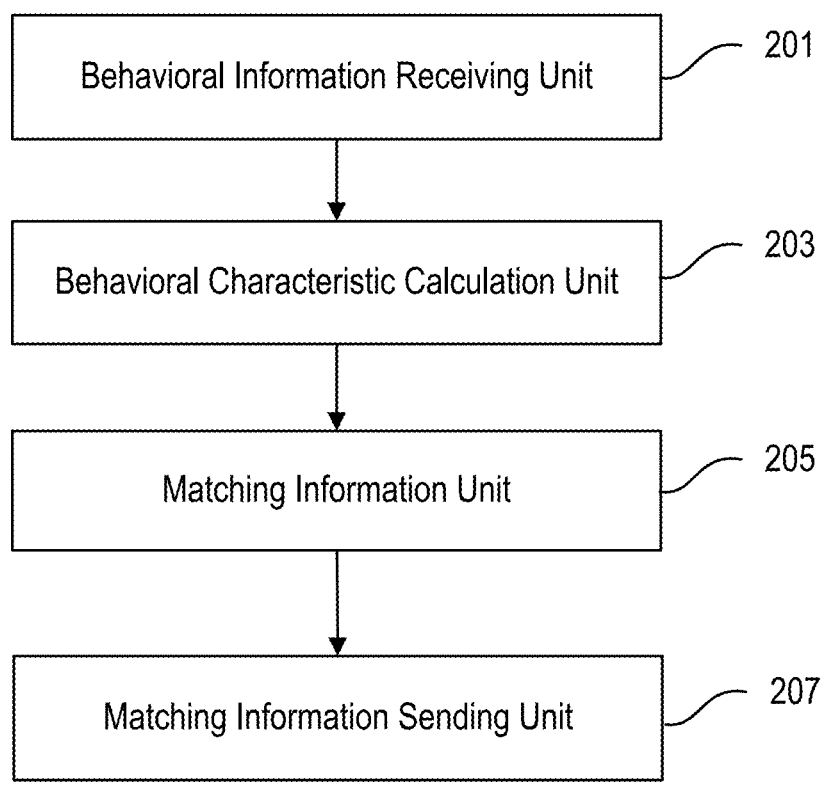
FIG. 2 is a diagram of an apparatus for pushing information according to some embodiments of the disclosure.

FIG. 2 is a diagram of an apparatus for pushing information according to some embodiments of the disclosure.

The apparatus for pushing information includes: a behavioral information receiving unit 201, a behavioral characteristic calculation unit 203, a matching information unit 205, and a matching information sending unit 207.

The behavioral information receiving unit 201 is configured to receive dynamic spatio-temporal behavior data of a moving individual.

The behavioral characteristic calculation unit 203 is configured to analyze historical dynamic spatio-temporal behavior data of the moving individual to acquire spatio-temporal behavioral characteristics of the moving individual.

The matching information unit 205 is configured to determine appropriate information as matching information for the moving individual according to the spatio-temporal behavioral characteristics of the moving individual in combination with dynamic spatio-temporal behavior data of the moving individual at a current time.

The matching information sending unit 207 is configured to send the matching information to the moving individual.

In one embodiment, the behavioral information receiving unit 201 further includes: a static information receiving unit.

In this embodiment, static information receiving unit is configured to receive static information of the moving individual, wherein the static information at least comprises profile information of the moving individual. When the moving individual has a transportation vehicle, the static information may further comprise vehicular information of the transportation vehicle owned by the moving individual.

The behavioral information receiving unit 201 is specifically configured to receive region positioning information reflecting a location of the moving individual and time information reflecting an information generation time.

In one embodiment, the behavioral information receiving unit 201 is further configured to receive a moving distance between sampling points.

The behavioral characteristic calculation unit 203 is configured to calculate clock-in and clock-out time of the moving individual, clock-in and clock-out locations of the moving individual, a short break time of the moving individual, and a short break location of the moving individual.

In one embodiment, the behavioral characteristic calculation unit 203 further includes: a time acquisition unit, a break time calculation unit, a recording times judgment unit, an hour period calculation unit, and an hour period average calculation unit.

The time acquisition unit is configured to acquire appearance times and disappearance times of the moving individual from the dynamic spatio-temporal behavior data.

The break time calculation unit is configured to calculate a break time according to an appearance time of the moving individual and a disappearance time of the moving individual that appear in groups, and determine whether the break time is within a break condition, and if yes, record the break time.

The recording times judgment unit is configured to determine whether the frequency of recorded break time of the moving individual exceeds a predetermined threshold.

The hour period calculation unit is configured to receive a result of the recording times judgment unit; and if a frequency of the recorded break time of the moving individual exceeds a predetermined threshold, calculate an appearing frequency of the appearance time of the moving individual in each hour period and calculate an appearing frequency of the disappearance time of the moving individual in each hour period.

The hour period average calculation unit is configured to acquire an hour period having the highest appearing frequency of the appearance time of the moving individual and an hour period having the highest appearing frequency of the disappearance time of the moving individual; calculate an average of the appearance times of the moving individual within the hour period and an average of the disappearance times of the moving individual within the hour period; use the average of the appearance times of the moving individual as the clock-in time of the moving individual; and use the average of the disappearance times of the moving individual as the clock-out time of the moving individual.

In one embodiment, the behavioral characteristic calculation unit 203 further includes: a time average calculation unit.

The time average calculation unit is configured to receive a result of the recording times judgment unit; and if the frequency of recorded break time of the moving individual does not exceed a predetermined threshold, calculate an average of the appearance time of the moving individual and an average of the disappearance time of the moving individual; use the average of the appearance time of the moving individual as the clock-in time of the moving individual, and use the average of the disappearance time of the moving individual as the clock-out time of the moving individual.

The break time calculation unit is specifically configured to compare a length of the break time with a time length specified by the break condition; and if the length of the break time is within the time length specified by the break condition, determine that the break time is within the break condition.

In one embodiment, the behavioral characteristic calculation unit 203 further includes: a region positioning information acquisition unit, a location calculation unit, a median location calculation unit, an abnormal point filtering unit, and a location average calculation unit.

The region positioning information acquisition unit is configured to acquire, according to the recorded break time, region positioning information of appearance times and disappearance times of the moving individual that corresponds to the break time.

The location calculation unit is configured to calculate an average of the region positioning information of the appearance times of the moving individual; and calculate an average of the region positioning information of the disappearance times of the moving individual.

The median location calculation unit is configured to compare region positioning information of each appearance time of the moving individual with the average of the region positioning information; obtain region positioning information of an appearance time of the moving individual closest to the average of the region positioning information; and further acquire region positioning information corresponding to the appearance time; use the region positioning information as a median point of the clock-in location; and compare region positioning information of each disappearance time of the moving individual with the average of the region positioning information; obtain region positioning information of a disappearance time of the moving individual closest to the average of the region positioning information; and further acquire region positioning information corresponding to the disappearance time; and use the region positioning information as a median point of the clock-out location.

The abnormal point filtering unit is configured to filter out region positioning information corresponding to an appearance time of the moving individual whose distance to the median point of the clock-in location is greater than a predetermined distance; and configured to filter out region positioning information corresponding to a disappearance time of the moving individual whose distance to the median point of the clock-out location is greater than a predetermined distance.

The location average calculation unit is configured to calculate an average of remaining region positioning information corresponding to appearance times of the moving individual and an average of remaining region positioning information of locations of disappearance times of the moving individual; use the average of the remaining region positioning information of the appearance times of the moving individual as the clock-in location of the moving individual; and use the location of the average of the remaining region positioning information of the disappearance times of the moving individual as the clock-out location of the moving individual.

In one embodiment, the behavioral characteristic calculation unit 203 further includes: a median calculation unit and an average calculation unit.

The median calculation unit is configured to calculate an average of the region positioning information of appearance times of the moving individual and an average of the region positioning information of disappearance times of the moving individual; use the average of the region positioning information as a median point of the clock-in location, and use the average of the region positioning information as a median point of the clock-out location.

The average calculation unit is configured to calculate region positioning information of each appearance time of the moving individual with the median point of the clock-in location; obtain region positioning information of an appearance time of the moving individual closest to the median point of the clock-in location, and use the region positioning information as the clock-in location of the moving individual; and to calculate region positioning information of each disappearance time of the moving individual with the median point of the clock-out location; obtain region positioning information of a disappearance time of the moving individual closest to the median point of the clock-out location, and use the region positioning information as the clock-out location of the moving individual.

In one embodiment, the behavioral characteristic calculation unit 203 further includes: a short break judgment unit, a region division unit, and a short break location acquisition unit.

The short break judgment unit is configured to calculate a break time according to an appearance time of the moving individual and a disappearance time of the moving individual that appear in groups, and determine whether the break time is within a short break condition; and if yes, recording the break time.

The region division unit is configured to receive a result of the recording times judgment unit; and if the frequency of recorded break time of the moving individual exceeds a predetermined threshold, divide a city where the moving individual is located into a plurality of regions according to the latitude and longitude coordinates data of the city.

The short break location acquisition unit is configured to obtain a region containing the greatest number of pieces of region positioning information of the moving individual; and using the region as the location where the moving individual takes a short break.

In one embodiment, the short break judgment unit is specifically configured to compare a length of the break time with a time length specified by the short break condition; and if the length of the break time is within the time length specified by the short break condition, determine that the break time is within the short break condition.

In one embodiment, the region division unit is specifically configured to convert the latitude and longitude coordinates data of the city that the moving individual is located in into Geohash coded strings.

In one embodiment, the behavioral characteristic calculation unit 203 further includes: a short break time acquisition unit, a time interval number calculation unit, a base point acquisition unit, a time interval calculation unit, and a short break time calculation unit.

The short break time acquisition unit is configured to acquire appearance times and disappearance times of the moving individual at the location for short breaks.

The time interval number calculation unit is configured to calculate one by one each time interval between appearance times of the moving individual; acquire the number of time intervals between appearance times of the moving individual having a time length shorter than a predetermined time; and to calculate one by one each time interval between disappearance times of the moving individual; and acquire the number of time intervals between disappearance times of the moving individual having a time length shorter than a predetermined time.

The base point acquisition unit is configured to acquire an appearance time of the moving individual having the greatest number of time intervals shorter than the predetermined time; and use the appearance time of the moving individual as an appearance base point; and to acquire a disappearance time of the moving individual having the greatest number of time intervals shorter than the predetermined time; and use the disappearance time of the moving individual as a disappearance base point.

The time interval calculation unit is configured to calculate a time interval between each appearance time of the moving individual at the short break location and the appearance base point; obtain appearance times of the moving individual having time intervals shorter than the predetermined time; and to calculate a time interval between each disappearance time of the moving individual at the short break location and the disappearance base point, and obtain disappearance times of the moving individual having time intervals shorter than the predetermined time.

The short break time calculation unit is configured to calculate an average of the appearance times of the moving individual having the time intervals shorter than the predetermined time; and use the average of the appearance times of the moving individual having the time intervals shorter than the predetermined time as a short break start time of the moving individual; and to calculate an average of the disappearance times of the moving individual having the time intervals shorter than the predetermined time; and use the average of the disappearance times of the moving individual having the time intervals shorter than the predetermined time as a short break end time of the moving individual.

In one embodiment, the matching information unit 205 further includes: a location query unit and an information query unit.

The location query unit is configured to acquire clock-in and clock-out locations and a short break location of the moving individual.

The information query unit is configured to query for shop information and restaurant information in regions where the clock-in and clock-out locations and the short break location are located; and use the shop information and the restaurant information as the matching information of the moving individual.

In one embodiment, the apparatus for pushing information further includes: an information recycling unit, a keyword acquisition unit, a keyword query unit, and a keyword information sending unit.

The information recycling unit is configured to receive matching information on which an operation has been performed by the moving individual.

The keyword acquisition unit is configured to acquire keywords according to the matching information, wherein the keywords comprise: restaurant type or types of goods.

The keyword query unit is configured to query for matching information matching the keywords.

The keyword information sending unit is configured to send the matching information matching the keywords to the moving individual.

A method for pushing information and an apparatus for pushing information are provided in the aforementioned embodiments. In addition, the disclosure further provides a method for collecting behavioral information of a moving individual. The embodiment of the method for collecting behavioral information of a moving individual is as follows.

Figure 3:
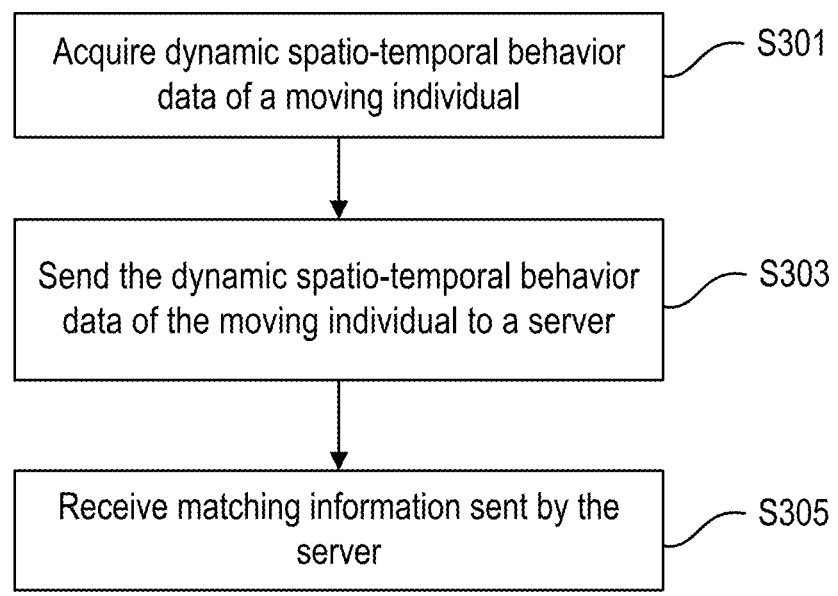
FIG. 3 is a flow diagram illustrating a method for collecting behavioral information of a moving individual provided according to some embodiments of the disclosure.

FIG. 3 is a flow diagram illustrating a method for collecting behavioral information of a moving individual provided according to some embodiments of the disclosure.

The method for collecting behavioral information of a moving individual includes the following steps.

Step S301: acquire dynamic spatio-temporal behavior data of a moving individual.

In one embodiment, acquiring dynamic spatio-temporal behavior data of a moving individual may be implemented through the following steps: acquiring time information through a startup time of the transportation vehicle owned by the moving individual; acquiring time information through a time of connection from a Bluetooth device in the transportation vehicle owned by the moving individual to a mobile terminal carried by the moving individual, and acquiring region positioning information of a region where the moving individual is located by the mobile terminal; acquiring time information through an on and off time of a positioning device in the transportation vehicle owned by the moving individual, and acquiring region positioning information of a region where the moving individual is located by the positioning device; acquiring the dynamic spatio-temporal behavior data by an apparatus installed in a mobile terminal carried by the moving individual; and acquiring the dynamic spatio-temporal behavior data by a dedicated device in the transportation vehicle owned by the moving individual.

In one embodiment, acquiring dynamic spatio-temporal behavior data of the moving individual may also comprise acquiring dynamic spatio-temporal behavior data through a combination of the aforementioned manners. In addition to the aforementioned manners, the dynamic spatio-temporal behavior data of the moving individual may also be obtained in other manners depending on different devices for acquiring dynamic spatio-temporal behavior data of a moving individual. For example, a pressure sensor is provided on a seat of a transportation vehicle and dynamic spatio-temporal behavior data of the moving individual is acquired through the pressure sensor.

The dynamic spatio-temporal behavior data of the moving individual specifically includes: region positioning information reflecting a location of the moving individual and time information reflecting an information generation time.

It should be noted that in one embodiment, prior to the step of acquiring dynamic spatio-temporal behavior data of a moving individual, the method further includes: acquiring static information of the moving individual, wherein the static information at least comprises profile information of the moving individual; and when the moving individual has a transportation vehicle, the static information may further comprise vehicular information of the transportation vehicle owned by the moving individual; and sending the static information of the moving individual to the server; and the acquiring static information of the moving individual is implemented through at least one of the following manners: profile information of the moving individual previously provided by the moving individual; and when the moving individual has a transportation vehicle, the static information may further comprise vehicular information of the transportation vehicle owned by the moving individual; and profile information of the moving individual and vehicular information of the transportation vehicle owned by the moving individual that are obtained from a third-party data source. The third-party data source may be historical information generated from the moving individual's browsing behavior, keywords in information querying, and registration information left in applications.

For example, the profile information of the moving individual may be the height, weight, age, birthplace, occupation, hobbies, dietary habits, and so on; the vehicular information of the transportation vehicle owned by the moving individual may be the model, quantity, brand, and so on of the transportation vehicle.

The dynamic spatio-temporal behavior data of the moving individual further includes: a moving distance between sampling points.

Through these steps, sources from which information of a moving individual is collected are increased; more sufficient behavioral information of the moving individual can then be collected, which enables a deep mining of the behavioral characteristics of the moving individual, thereby improving the quality of the pushed information with more diversified, targeted, and accurate content.

Step S303: send the dynamic spatio-temporal behavior data of the moving individual to a server.

In one embodiment, sending the dynamic spatio-temporal behavior data of the moving individual to a server may be implemented through the following steps: sending dynamic spatio-temporal behavior data of the moving individual to the server at a specific time interval (for example, 2 minutes or 5 minutes); or sending dynamic spatio-temporal behavior data of the moving individual to the server in real time by means of wireless communication. In the second manner, further preferably, dynamic spatio-temporal behavior data of a moving individual appearing or disappearing to the server at the time when it is detected that the moving individual appears or disappears. The second manner can reduce the communication frequency performed between the apparatus for collecting behavioral information of a moving individual and the server; and reduce energy consumption for both parties.

Step S305: receive matching information sent by the server.

In one embodiment, after the step of receiving matching information sent by the server, the method further includes: determining whether the moving individual has performed an operation on the matching information; and if yes, sending the matching information on which the operation has been performed to the server.

It should be noted that the operation performed by the moving individual on the matching information includes: an operation on the matching information triggered or executed by the moving individual; for example, downloading, adding to Favorites, clicking a "Like" control, listening, and so on.

A method for collecting behavioral information of a moving individual is provided in the aforementioned embodiment. In accordance with the aforementioned method for collecting behavioral information of a moving individual, the disclosure further provides an apparatus for collecting behavioral information of a moving individual. The apparatus embodiment is similar to the method embodiment and the following description is relatively concise. Reference can be made to the description of the method embodiments for related parts. The apparatus embodiment described below is merely exemplary.

Figure 4:
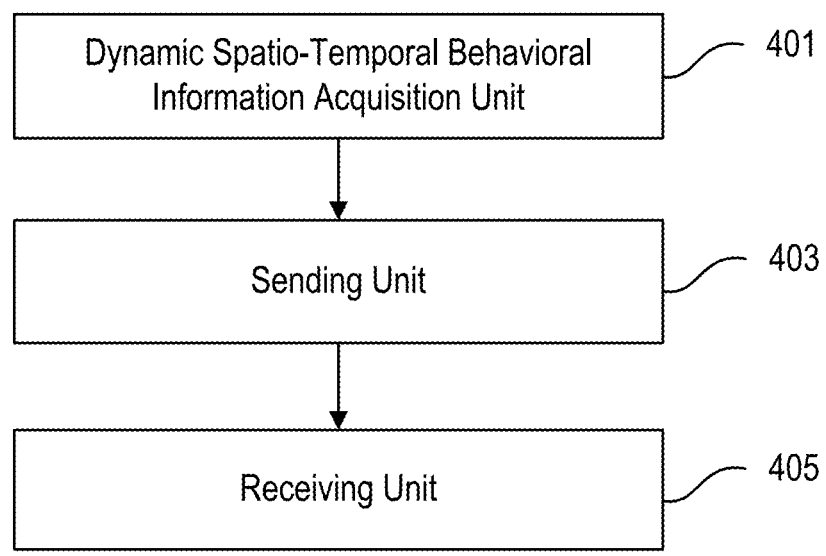
FIG. 4 is a diagram of an apparatus for collecting behavioral information of a moving individual according to some embodiments of the disclosure.

FIG. 4 is a diagram of an apparatus for collecting behavioral information of a moving individual according to some embodiments of the disclosure.

The apparatus for collecting behavioral information of a moving individual includes: a dynamic spatio-temporal behavioral information acquisition unit 401, a sending unit 403, and a receiving unit 405.

The dynamic spatio-temporal behavioral information acquisition unit 401 is configured to acquire dynamic spatio-temporal behavior data of a moving individual.

The sending unit 403 is configured to send the dynamic spatio-temporal behavior data of a moving individual to a server.

The receiving unit 405 is configured to receive matching information sent by the server.

In one embodiment, the apparatus for collecting behavioral information of a moving individual further includes: a static information acquisition unit and a static information sending unit.

The static information acquisition unit is configured to acquire static information of the moving individual, wherein the static information at least comprises profile information of the moving individual; and when the moving individual has a transportation vehicle, the static information may further comprise vehicular information of the transportation vehicle owned by the moving individual.

The static information sending unit is configured to send the static information of the moving individual to the server.

In one embodiment, the dynamic spatio-temporal behavioral information acquisition unit 401 is specifically configured to acquire region positioning information reflecting a location of the moving individual and time information reflecting an information generation time.

In one embodiment, the dynamic spatio-temporal behavioral information acquisition unit 401 further includes: a moving distance acquisition unit.

The moving distance acquisition unit is configured to acquire a moving distance between sampling points.

In one embodiment, the apparatus for collecting behavioral information of a moving individual further includes: a matching information determining unit and a sending unit.

The matching information determining unit is configured to determine whether the moving individual has performed an operation on the matching information.

The sending unit is configured to receive a result of the matching information determining unit, and send the matching information on which the operation has been performed to the server.

A method for pushing information, an apparatus for pushing information, a method for collecting behavioral information of a moving individual, and an apparatus for collecting behavioral information of a moving individual are provided in the aforementioned embodiments. In addition, the disclosure further provides a system for pushing information. The embodiment of the system for pushing information is as follows.

Figure 5:
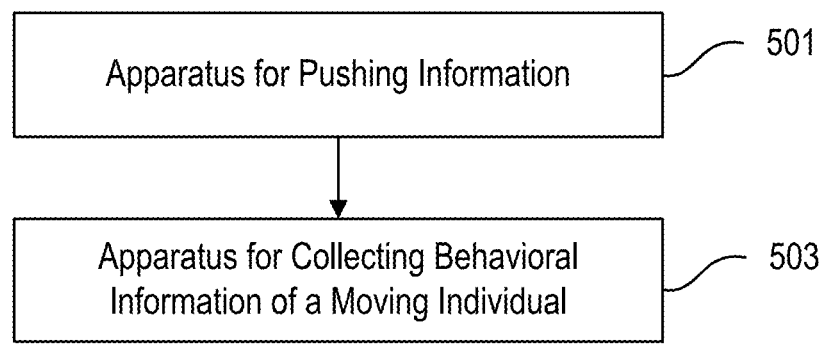
FIG. 5 is a diagram of a system for pushing information provided according to some embodiments of the disclosure.

FIG. 5 is a diagram of a system for pushing information provided according to some embodiments of the disclosure.

The system for pushing information includes: an apparatus 501 for pushing information and an apparatus 503 for collecting behavioral information of a moving individual.

The apparatus 501 for pushing information is configured to receive dynamic spatio-temporal behavior data of a moving individual; analyze historical dynamic spatio-temporal behavior data of the moving individual to acquire time- and space-related behavioral characteristics of the moving individual; determining appropriate information as matching information for the moving individual according to the spatio-temporal behavioral characteristics of the moving individual in combination with dynamic spatio-temporal behavior data of the moving individual at a current time; and sending the matching information to the moving individual.

It should be noted that reference can be made to the corresponding description of the aforementioned embodiments for relevant parts of the apparatus 501 for pushing information, which will not be repeated herein but is incorporated herein by reference.

The apparatus 503 for collecting behavioral information of a moving individual is configured to acquire dynamic spatio-temporal behavior data of a moving individual, and send the dynamic spatio-temporal behavior data of the moving individual to a server by means of wireless communication.

It should be noted that the apparatus 503 for collecting behavioral information of a moving individual is installed in a mobile terminal device; and reference can be made to the corresponding description of the aforementioned embodiments for relevant parts of the apparatus 503 for collecting behavioral information of a moving individual, which will not be repeated herein but is incorporated herein by reference.

A method for pushing information, an apparatus for pushing information, a method for collecting behavioral information of a moving individual, an apparatus for collecting behavioral information of a moving individual, and a system for pushing information are provided in the aforementioned embodiments.

In addition, the disclosure further provides an electronic device. The embodiment of the electronic device is as follows.

Figure 6:
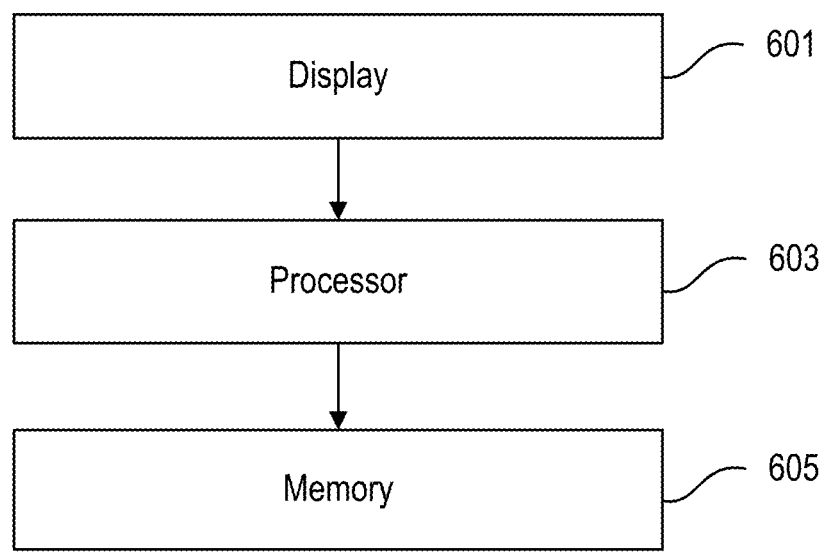
FIG. 6 is a diagram of an electronic touch screen device for pushing information according to some embodiments of the disclosure.

FIG. 6 is a diagram of an electronic touch screen device for pushing information according to some embodiments of the disclosure.

The electronic device includes: a display 601, a processor 603, and a memory 605.

The memory 605 is configured to store the a program that, when read and executed by the processor, performs the following operations: receive information regarding dynamic spatio-temporal behavior of a moving individual; analyze historical data of the information regarding the dynamic spatio-temporal behavior of the moving individual to acquire time- and space-related behavioral characteristics of the moving individual; determine appropriate information as matching information for the moving individual according to the spatio-temporal behavioral characteristics of the moving individual in combination with dynamic spatio-temporal behavior data of the moving individual at a current time; and send the matching information to the moving individual.

In a typical configuration, a computer device includes one or more processors (CPUs), input/output interfaces, network interfaces and memories.

The memory may include a computer readable medium in the form of a non-permanent memory, a random-access memory (RAM) and/or a non-volatile memory or the like, such as a read-only memory (ROM) or a flash memory (flash RAM). The memory is an example of a computer readable medium.

The computer readable medium includes permanent and non-permanent, movable and non-movable media that can achieve information storage by means of any methods or techniques. The information may be computer readable instructions, data structures, modules of programs or other data. Examples of storage medium of computer include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include non-transitory computer readable media (transitory media), such as modulated data signals and carrier waves.

Those skilled in the art should realize that the embodiments described above may be provided as a method, a system, or a computer program product. Therefore, the disclosure may use forms of a full hardware embodiment, a full software embodiment, or an embodiment combining software and hardware aspects. Moreover, the disclosed embodiments may employ the form of a computer program product implemented on one or more computer usable storage media (including, but not limited to, a magnetic disk memory, a CD-ROM, an optical memory, and so on) containing computer usable program code therein.

The embodiments have been disclosed above through the disclosed embodiments, but is not intended to be limited thereto. Possible variations and modifications can be made by those skilled in the art without departing from the spirit and scope of the disclosure. Therefore, the scope of the disclosed embodiments shall be defined by the claims of the disclosure.

The invention claimed is:

1. A method comprising:
receiving, at a server computer, dynamic spatio-temporal behavior data of a moving individual from a wireless computing device of the moving individual;
identifying, by the server computer, one or more appearance times and disappearance times of the moving individual included in the dynamic spatio-temporal behavior data;
analyzing, by the server computer, the dynamic spatio-temporal behavior data of the moving individual to acquire spatio-temporal behavioral characteristics of the moving individual based on the one or more appearance times and disappearance times, the spatio-temporal behavioral characteristics of the moving individual comprise one of: clock-in and clock-out times of the moving individual, clock-in and clock-out locations of the moving individual, short break times of the moving individual, and short break locations of the moving individual;
generating, by the server computer, a query for matching information, the query generated using the spatio-temporal behavioral characteristics;
receiving, by the server computer, the matching information responsive to the query, the matching information comprising push notification data to send to the wireless computing device;
determining, by the server computer, that a current attribute matches the spatio-temporal behavioral characteristics, the current attribute selected from a group consisting of a current time or a current location of the wireless computing device;
pushing, by the server computer, the matching information to the wireless computing device of the moving individual.

2. The method of claim 1 wherein prior to receiving dynamic spatio-temporal behavior data of a moving individual, the method comprises receiving, by the server computer, profile information of the moving individual or vehicular information of the moving individual.

3. The method of claim 1 further comprising calculating a clock-in time of the moving individual and a clock-out time of the moving individual, wherein calculating a clock-in time of the moving individual and a clock-out time of the moving individual comprises:
calculating, by the server computer, a break time according to an appearance time of the moving individual and a disappearance time of the moving individual appearing in groups;
recording, by the server computer, the break time upon determining that the break time is within a break condition;
determining, by the server computer, whether a frequency of the recorded break time of the moving individual exceeds a predetermined threshold;
calculating, by the server computer, an appearing frequency of the appearance time of the moving individual in each hour period and calculating an appearing frequency of a disappearance time of the moving individual in each hour period upon determining that the frequency of the recorded break time of the moving individual exceeds a predetermined threshold;
acquiring, by the server computer, a first hour period having the highest appearing frequency of the appearance time of the moving individual;
calculating, by the server computer, an average of the appearance times of the moving individual within the first hour period;
using, by the server computer, the average of the appearance times of the moving individual as the clock-in time of the moving individual;
acquiring, by the server computer, a second hour period having the highest appearing frequency of the disappearance time of the moving individual;
calculating, by the server computer, an average of the disappearance times of the moving individual within the second hour period; and
using, by the server computer, the average of the disappearance times of the moving individual as the clock-out time of the moving individual.

4. The method of claim 3 wherein determining if the frequency of the recorded break time of the moving individual exceeds a predetermined threshold comprises:
determining, by the server computer, that the frequency of the recorded break time of the moving individual does not exceed a predetermined threshold;
calculating, by the server computer, an average of the appearance times of the moving individual;
using, by the server computer, the average of the appearance times of the moving individual as the clock-in time of the moving individual;
calculating, by the server computer, an average of the disappearance times of the moving individual; and
using, by the server computer, the average of the disappearance times of the moving individual as the clock-out time of the moving individual.

5. The method of claim 1 further comprising:
acquiring, by the server computer, according to a recorded break time, region positioning information of the appearance times and disappearance times of the moving individual corresponding to the recorded break time;
calculating, by the server computer, an average of the region positioning information of the appearance times of the moving individual;
comparing, by the server computer, region positioning information of each appearance time of the moving individual with the average of the region positioning information;

obtaining, by the server computer, region positioning information of an appearance time of the moving individual closest to the average of the region positioning information;

using, by the server computer, the region positioning information of an appearance time of the moving individual closest to the average of the region positioning information as a median point of a clock-in location;

filtering out, by the server computer, region positioning information corresponding to an appearance time of the moving individual at a location with a distance to the median point of the clock-in location greater than a predetermined distance;

calculating, by the server computer, an average of remaining region positioning information corresponding to appearance times of the moving individual; and using, by the server computer, the average of the remaining region positioning information of the appearance times of the moving individual as the clock-in location of the moving individual.

6. The method of claim 5 further comprising:

calculating, by the server computer, an average of the region positioning information of the disappearance times of the moving individual;

comparing, by the server computer, region positioning information of each disappearance time of the moving individual with the average of the region positioning information;

obtaining, by the server computer, region positioning information of a disappearance time of the moving individual closest to the average of the region positioning information;

using, by the server computer, the region positioning information of a disappearance time of the moving individual closest to the average of the region positioning inform as a median point of the clock-out location;

filtering, by the server computer, out region positioning information corresponding to a disappearance time of the moving individual at a location with a distance to the median point of a clock-out location greater than a predetermined distance;

calculating, by the server computer, an average of remaining region positioning information corresponding to disappearance times of the moving individual; and using, by the server computer, the average of the remaining region positioning information of the disappearance times of the moving individual as the clock-out location of the moving individual.

7. The method of claim 1 further comprising:

receiving, by the server computer, matching information on which an operation has been performed by the moving individual;

acquiring, by the server computer, keywords according to the matching information, wherein the keywords comprise: a commodity type or a restaurant type;

querying, by the server computer, for matching information matching the keywords; and sending, by the server computer, the matching information matching the keywords to the moving individual.

8. The method of claim 3 further comprising:

acquiring, by the server computer, according to the recorded break time, region positioning information of the appearance times and disappearance times of the moving individual corresponding to the break time;

calculating, by the server computer, an average of the region positioning information of the appearance times of the moving individual;

using, by the server computer, the average of the region positioning information of the appearance times as a median point of a clock-in location;

comparing, by the server computer, region positioning information of each of the appearance times of the moving individual with the median point of a clock-in location;

obtaining, by the server computer, region positioning information of an appearance time of the moving individual closest to the median point of the clock-in location;

using, by the server computer, the region positioning information of an appearance time of the moving individual closest to the median point of the clock-in location as the clock-in location of the moving individual;

calculating, by the server computer, an average of the region positioning information of the disappearance times of the moving individual;

using, by the server computer, the average of the region positioning information of the disappearance times as a median point of a clock-out location;

comparing, by the server computer, region positioning information of each of the disappearance times of the moving individual with the median point of a clock-out location;

obtaining, by the server computer, region positioning information of a disappearance time of the moving individual closest to the median point of a clock-out location; and using, by the server computer, the region positioning information of a disappearance time of the moving individual closest to the median point of a clock-out location as the clock-out location of the moving individual.

9. The method of claim 1 further comprising:

calculating, by the server computer, a break time according to an appearance time of the moving individual and a disappearance time of the moving individual that appear in groups;

recording, by the server computer, the break time upon determining that the break time is within a break condition;

acquiring, by the server computer, according to the recorded break time, region positioning information of the appearance times and disappearance times of the moving individual corresponding to the break time;

determining, by the server computer, whether a frequency of the recorded break time of the moving individual exceeds a predetermined threshold;

dividing, by the server computer, a city where the moving individual is located into a plurality of regions according to latitude and longitude data of the city upon determining that a frequency of the recorded break time of the moving individual exceeds a predetermined threshold;

obtaining, by the server computer, a region containing the greatest number of pieces of region positioning information of the moving individual; and using, by the server computer, the region as the short break location of the moving individual.

10. The method of claim 9 further comprising:
acquiring, by the server computer, the appearance times and disappearance times of the moving individual at the short break location;
calculating, by the server computer, each time interval between appearance times of the moving individual;
acquiring, by the server computer, the number of time intervals between appearance times of the moving individual having a time length shorter than a predetermined time;
acquiring, by the server computer, an appearance time of the moving individual having the greatest number of time intervals shorter than the predetermined time;
using, by the server computer, the appearance time of the moving individual as an appearance base point;
calculating, by the server computer, a time interval between each appearance time of the moving individual at the short break location and the appearance base point;
obtaining, by the server computer, appearance times of the moving individual having time intervals shorter than the predetermined time;
calculating, by the server computer, an average of the appearance times of the moving individual having the time intervals shorter than the predetermined time; and
using, by the server computer, the average of the appearance times of the moving individual having the time intervals shorter than the predetermined time as the short break start time of the moving individual.

11. The method of claim 10 further comprising:
calculating, by the server computer, each time interval between the disappearance times of the moving individual;
acquiring, by the server computer, the number of time intervals between disappearance times of the moving individual having a time length shorter than a predetermined time;
acquiring, by the server computer, a disappearance time of the moving individual having the greatest number of time intervals shorter than the predetermined time;
using, by the server computer, the disappearance time of the moving individual as a disappearance base point;
calculating, by the server computer, a time interval between each disappearance time of the moving individual at the short break location and the disappearance base point;
obtaining, by the server computer, disappearance times of the moving individual having time intervals shorter than the predetermined time;
calculating, by the server computer, an average of the disappearance times of the moving individual having the time shorter than the predetermined time; and
using, by the server computer, the average of the disappearance times of the moving individual having the time intervals shorter than the predetermined time as the short break end time of the moving individual.

12. The method of claim 1 wherein the dynamic spatio-temporal behavior data of a moving individual comprises region positioning information identifying, by the server computer, a location of the moving individual and time information identifying an information generation time associated with the region positioning information.

13. An apparatus comprising:
a processor; and
a non-transitory memory storing computer-executable instructions therein that, when executed by the processor, cause the apparatus to perform the operations of:
receiving dynamic spatio-temporal behavior data of a moving individual from a wireless computing device of the moving individual,
identifying one or more appearance times and disappearance times of the moving individual included in the dynamic spatio-temporal behavior data,
analyzing the dynamic spatio-temporal behavior data of the moving individual to acquire spatio-temporal behavioral characteristics of the moving individual based on the one or more appearance times and disappearance times, the spatio-temporal behavioral characteristics of the moving individual comprise one of: clock-in and clock-out times of the moving individual, clock-in and clock-out locations of the moving individual, short break times of the moving individual, and short break locations of the moving individual,
generating, by the server computer, a query for matching information, the query generated using the spatio-temporal behavioral characteristics,
receiving, by the server computer, the matching information responsive to the query, the matching information comprising push notification data to send to the wireless computing device,
determining, by the server computer, that a current attribute matches the spatio-temporal behavioral characteristics, the current attribute selected from a group consisting of a current time or a current location of the wireless computing device,
pushing the matching information to the wireless computing device moving individual.

14. The apparatus of claim 13 wherein prior to receiving dynamic spatio-temporal behavior data of a moving individual, the operations further include receiving profile information of the moving individual or vehicular information of the moving individual.

15. The apparatus of claim 13 wherein the operations further comprise calculating a clock-in time of the moving individual and a clock-out time of the moving individual, wherein calculating a clock-in time of the moving individual and a clock-out time of the moving individual comprises:
calculating a break time according to an appearance time of the moving individual and a disappearance time of the moving individual appearing in groups;
recording the break time upon determining that the break time is within a break condition;
determining whether a frequency of the recorded break time of the moving individual exceeds a predetermined threshold;
calculating an appearing frequency of the appearance time of the moving individual in each hour period and calculating an appearing frequency of a disappearance time of the moving individual in each hour period upon determining that the frequency of the recorded break time of the moving individual exceeds a predetermined threshold;
acquiring a first hour period having the highest appearing frequency of the appearance time of the moving individual;
calculating an average of the appearance times of the moving individual within the first hour period;
using the average of the appearance times of the moving individual as the clock-in time of the moving individual;
acquiring a second hour period having the highest appearing frequency of the disappearance time of the moving individual;

calculating an average of the disappearance times of the moving individual within the second hour period; and using the average of the disappearance times of the moving individual as the clock-out time of the moving individual.

16. The apparatus of claim 15 wherein determining if the frequency of the recorded break time of the moving individual exceeds a predetermined threshold comprises:

determining that the frequency of the recorded break time of the moving individual does not exceed a predetermined threshold;

calculating an average of the appearance times of the moving individual;

using the average of the appearance times of the moving individual as the clock-in time of the moving individual;

calculating an average of the disappearance times of the moving individual; and using the average of the disappearance times of the moving individual as the clock-out time of the moving individual.

17. The apparatus of claim 13 further instructions causing to processor to perform the operations of:

acquiring, according to a recorded break time, region positioning information of the appearance times and disappearance times of the moving individual corresponding to the recorded break time;

calculating an average of the region positioning information of the appearance times of the moving individual;

comparing region positioning information of each appearance time of the moving individual with the average of the region positioning information;

obtaining region positioning information of an appearance time of the moving individual closest to the average of the region positioning information;

using the region positioning information of an appearance time of the moving individual closest to the average of the region positioning information as a median point of a clock-in location;

filtering out region positioning information corresponding to an appearance time of the moving individual at a location with a distance to the median point of the clock-in location greater than a predetermined distance; and calculating an average of remaining region positioning information corresponding to appearance times of the moving individual; and using the average of the remaining region positioning information of the appearance times of the moving individual as the clock-in location of the moving individual.

18. The apparatus of claim 17 further including instructions causing to processor to perform the operations of:

calculating an average of the region positioning information of the disappearance times of the moving individual;

comparing region positioning information of each disappearance time of the moving individual with the average of the region positioning information;

obtaining region positioning information of a disappearance time of the moving individual closest to the average of the region positioning information;

using the region positioning information of a disappearance time of the moving individual closest to the average of the region positioning inform as a median point of the clock-out location;

filtering out region positioning information corresponding to a disappearance time of the moving individual at a location with a distance to the median point of a clock-out location greater than a predetermined distance;

calculating an average of remaining region positioning information corresponding to disappearance times of the moving individual; and using the average of the remaining region positioning information of the disappearance times of the moving individual as the clock-out location of the moving individual.

19. The apparatus of claim 13 further including instructions causing to processor to perform the operations of:

receiving matching information on which an operation has been performed by the moving individual;

acquiring keywords according to the matching information, wherein the keywords comprise: a commodity type or a restaurant type;

querying for matching information matching the keywords; and sending the matching information matching the keywords to the moving individual.

20. The apparatus of claim 15 further including instructions causing to processor to perform the operations of:

acquiring, according to the recorded break time, region positioning information of the appearance times and disappearance times of the moving individual corresponding to the break time;

calculating an average of the region positioning information of the appearance times of the moving individual;

using the average of the region positioning information of the appearance times as a median point of a clock-in location;

comparing region positioning information of each of the appearance times of the moving individual with the median point of a clock-in location;

obtaining region positioning information of an appearance time of the moving individual closest to the median point of the clock-in location;

using the region positioning information of an appearance time of the moving individual closest to the median point of the clock-in location as the clock-in location of the moving individual;

calculating an average of the region positioning information of the disappearance times of the moving individual;

using the average of the region positioning information of the disappearance times as a median point of a clock-out location;

comparing region positioning information of each of the disappearance times of the moving individual with the median point of a clock-out location;

obtaining region positioning information of a disappearance time of the moving individual closest to the median point of a clock-out location; and using the region positioning information of a disappearance time of the moving individual closest to the median point of a clock-out location as the clock-out location of the moving individual.

21. The apparatus of claim 13 further including instructions causing to processor to perform the operations of:

calculating a break time according to an appearance time of the moving individual and a disappearance time of the moving individual that appear in groups;

recording the break time upon determining that the break time is within a break condition;

acquiring, according to the recorded break time, region positioning information of the appearance times and disappearance times of the moving individual corresponding to the break time;

determining whether a frequency of the recorded break time of the moving individual exceeds a predetermined threshold;

dividing a city where the moving individual is located into a plurality of regions according to latitude and longitude data of the city upon determining that a frequency of the recorded break time of the moving individual exceeds a predetermined threshold;

obtaining a region containing the greatest number of pieces of region positioning information of the moving individual; and using the region as the short break location of the moving individual.

22. The apparatus of claim 21 further including instructions causing to processor to perform the operations of:

acquiring the appearance times and disappearance times of the moving individual at the short break location;

calculating each time interval between appearance times of the moving individual;

acquiring the number of time intervals between appearance times of the moving individual having a time length shorter than a predetermined time;

acquiring an appearance time of the moving individual having the greatest number of time intervals shorter than the predetermined time;

using the appearance time of the moving individual as an appearance base point;

calculating a time interval between each appearance time of the moving individual at the short break location and the appearance base point;

obtaining appearance times of the moving individual having time intervals shorter than the predetermined time;

calculating an average of the appearance times of the moving individual having the time intervals shorter than the predetermined time; and using the average of the appearance times of the moving individual having the time intervals shorter than the predetermined time as the short break start time of the moving individual.

23. The apparatus of claim 22 further including instructions causing to processor to perform the operations of:

calculating each time interval between the disappearance times of the moving individual;

acquiring the number of time intervals between disappearance times of the moving individual having a time length shorter than a predetermined time;

acquiring a disappearance time of the moving individual having the greatest number of time intervals shorter than the predetermined time;

using the disappearance time of the moving individual as a disappearance base point;

calculating a time interval between each disappearance time of the moving individual at the short break location and the disappearance base point;

obtaining disappearance times of the moving individual having time intervals shorter than the predetermined time;

calculating an average of the disappearance times of the moving individual having the time shorter than the predetermined time; and using the average of the disappearance times of the moving individual having the time intervals shorter than the predetermined time as the short break end time of the moving individual.

24. The apparatus of claim 13 wherein the dynamic spatio-temporal behavior data of a moving individual comprises region positioning information identifying a location of the moving individual and time information identifying an information generation time associated with the region positioning information.

\* \* \* \* \*